(12) United States Patent
    Tsai et al.

(10) Patent No.:     US 12,695,707 B2
(45) Date of Patent:          Jul. 28, 2026

(54) PACKET DATA CONVERGENCE PROTOCOL SERVICE DATA UNIT DISCARD METHOD AND USER EQUIPMENT

(71) Applicant: Industrial Technology Research Institute, Hsinchu (TW)

(72) Inventors: Tzu-Jane Tsai, Hsinchu County (TW); Chun-Yuan Chiu, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 6 days.

(21) Appl. No.: 18/619,174

(22) Filed: Mar. 28, 2024

(65) Prior Publication Data
    US 2024/0340249 A1      Oct. 10, 2024

Related U.S. Application Data

(60) Provisional application No. 63/457,799, filed on Apr. 7, 2023.

(51) Int. Cl.
    *H04L 47/32*          (2022.01)
(52) U.S. Cl.
    CPC ................................... *H04L 47/32* (2013.01)
(58) Field of Classification Search
    CPC ....... H04L 47/32; H04L 5/0053; H04L 47/28; H04L 67/131; H04L 69/22; H04L 1/0008; H04L 43/0852; H04L 47/115; H04L 47/129; H04L 47/34; H04L 5/0044; H04L 5/0048; H04L 65/65; H04L 1/08;
    (Continued)

(56) References Cited

U.S. PATENT DOCUMENTS

2019/0268799 A1*  8/2019  Hong ...................... H04W 4/70
2020/0314701 A1*  10/2020  Talebi Fard .......... H04W 36/08
    (Continued)

FOREIGN PATENT DOCUMENTS

CN          116349289          6/2023
CN          116368783          6/2023

OTHER PUBLICATIONS

Vivo, "Discussion on PDU discard for XR awareness", 3GPP TSG-RAN WG2 Meeting #121, R2-2300322, Feb. 27-Mar. 3, 2023, pp. 1-7.

(Continued)

*Primary Examiner* — Djenane M Bayard
(74) *Attorney, Agent, or Firm* — JCIPRNET

(57)                    ABSTRACT

A PDCP SDU discard method, adapted for a UE, is provided. The method includes: setting one or more discard timers based on a RRC configuration transmitted from a network device; receiving a PDCP SDU from a upper layer, wherein the PDCP SDU corresponding to a PDU belonging to a PDU Set; and in response to receiving a PSI-based SDU discard indication from the network device, determining whether to discard the PDCP SDU or not according to a PSI of the PDU Set and a target discard timer. The step of determining whether to discard the PDCP SDU according to the PSI of the PDU Set and the target discard timer comprises: identifying the PSI of the PDU Set; determining the target discard timer corresponding to the PSI among the one or more discard timers; and discarding the PDCP SDU when the target discard timer is expired.

18 Claims, 20 Drawing Sheets

(58) Field of Classification Search

CPC ..... H04L 1/1614; H04L 1/1867; H04L 1/189; H04L 1/20; H04L 2001/0096; H04L 5/001; H04L 5/0094; H04L 1/1861; H04L 5/0098; H04L 1/0072; H04L 1/02; H04L 1/0026; H04L 1/1854; H04L 5/0032; H04L 5/0051; H04L 5/0091; H04L 1/1685; H04L 1/188; H04L 1/1887; H04L 1/1822; H04L 47/24; H04L 47/283; H04L 1/1642; H04L 1/0009; H04L 1/1812; H04L 1/1896; H04L 1/0025; H04L 1/004; H04W 28/0278; H04W 28/06; H04W 80/02; H04W 28/0268; H04W 36/0016; H04W 36/0033; H04W 36/08; H04W 36/13; H04W 92/20; H04W 72/1268; H04W 72/56; H04W 76/20; H04W 28/0252; H04W 28/0289; H04W 72/1263; H04W 8/22; H04W 24/02; H04W 28/02; H04W 28/0236; H04W 28/0263; H04W 28/0284; H04W 28/0858; H04W 28/0967; H04W 28/16; H04W 36/30; H04W 36/32; H04W 60/04; H04W 72/12; H04W 72/21; H04W 72/23; H04W 72/231; H04W 72/232; H04W 72/512; H04W 72/569; H04W 74/0833; H04W 76/10; H04W 76/12; H04W 76/22; H04W 76/38; H04W 8/26; H04W 84/042; H04W 88/14; H04W 76/15; H04W 36/0058; H04W 76/34; H04W 24/08; H04W 28/04; H04W 36/00837; H04W 36/00838; H04W 36/037; H04W 36/085; H04W 36/362; H04W 4/40; H04W 4/44; H04W 48/20; H04W 74/0838; H04W 88/06; H04W 92/18; H04W 16/32; H04W 28/0231; H04W 28/12; H04W 36/0061; H04W 36/04; H04W 36/06; H04W 36/14; H04W 4/70; H04W 40/04; H04W 48/02; H04W 48/12; H04W 24/10

See application file for complete search history.

(56) References Cited

U.S. PATENT DOCUMENTS

| | | | |
|---|---|---|---|
| 2021/0006644 A1 | 1/2021 | Yang et al. | |
| 2021/0029777 A1 | 1/2021 | Lv et al. | |
| 2021/0084539 A1* | 3/2021 | Centonza | H04W 28/06 |
| 2023/0224383 A1 | 7/2023 | Wang et al. | |
| 2023/0319638 A1 | 10/2023 | Kahn et al. | |
| 2024/0121663 A1* | 4/2024 | Malik | H04L 47/32 |
| 2025/0063427 A1* | 2/2025 | Sha | H04L 47/34 |

OTHER PUBLICATIONS

"Office Action of Taiwan Counterpart Application", issued on Nov. 27, 2024, p. 1-p. 16.

3GPP, "3rd Generation Partnership Project; Technical Specification Group Radio Access Network; NR; Study on XR enhancements for NR (Release 18)", 3GPP TR 38.835 V1.0.0, Dec. 2022, pp. 1-121.

3GPP, "3rd Generation Partnership Project; Technical Specification Group Radio Access Network; NR; Packet Data Convergence Protocol (PDCP) specification (Release 17)", 3GPP TS 38.323 V17.3.0, Dec. 2022, pp. 1-48.

3GPP, "3rd Generation Partnership Project; Technical Specification Group Radio Access Network; Study on XR (Extended Reality) Evaluations for NR (Release 17)", 3GPP TR 38.838 V17.0.0, Dec. 2021, pp. 1-272.

Nokia et al., "Updated WID on XR Enhancements for NR", 3GPP TSG RAN Meeting #99, RP-230786, Mar. 20-23, 2023, pp. 1-5.

Nokia et al., "PDU Discard for XR", 3GPP TSG-RAN WG2 Meeting #121, R2-2300155, Feb. 27-Mar. 3, 2023, pp. 1-4.

Ericsson, "Discussion on PDU Discard", 3GPP TSG-RAN WG2 #121, R2-2301509, Feb. 27-Mar. 3, 2023, pp. 1-4.

Fredrik Alriksson et al., "XR and 5G: Extended reality at scale with time-critical communication", Ericsson Technology Review, vol. 2021, Issue 8, Aug. 24, 2021, pp. 2-13.

Ericsson, "Discussion on PDU Discard", 3GPP TSG-RAN WG2 #121bis-e, R2-2303722, Apr. 17-26, 2023, pp. 1-3.

NEC, "Discussion on PDU discard for XR awareness", 3GPP TSG-RAN WG2 #120 meeting, R2-2212537, Nov. 14-18, 2022, pp. 1-4.

NEC, "PDU discard", 3GPP TSG-RAN WG2 #121-bis, R2-2303329, Apr. 17-26, 2023, pp. 1-4.

"Search Report of Europe Counterpart Application", issued on Sep. 9, 2024, p. 1-p. 12.

* cited by examiner

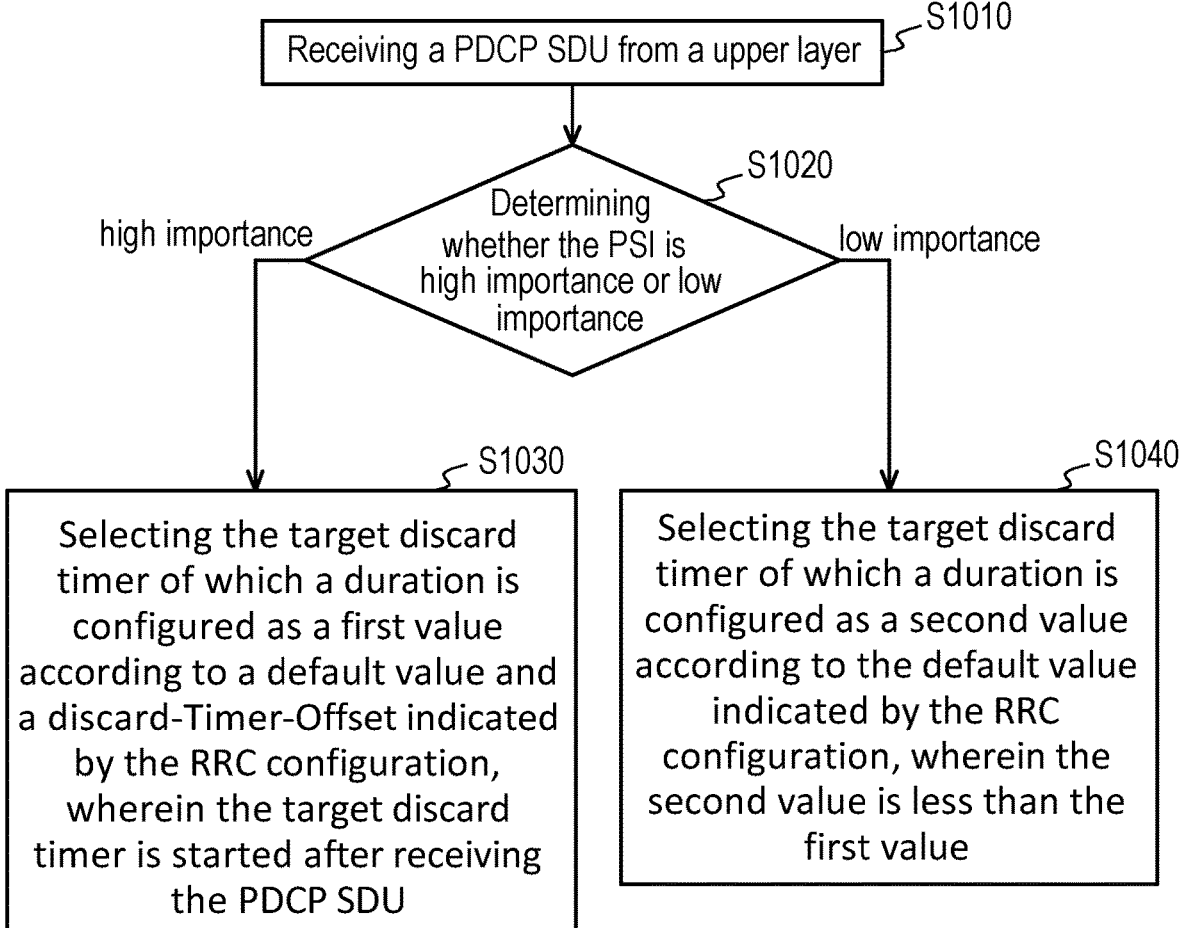

Receiving a PDCP SDU from a upper layer — S1010

Determining whether the PSI is high importance or low importance — S1020 high importance low importance

Selecting the target discard timer of which a duration is configured as a first value according to a default value and a discard-Timer-Offset indicated by the RRC configuration, wherein the target discard timer is started after receiving the PDCP SDU — S1030

Selecting the target discard timer of which a duration is configured as a second value according to the default value indicated by the RRC configuration, wherein the second value is less than the first value — S1040

| Field (Item) | Bits | Reference |
|---|---|---|
| SDU discard indication | 1 | |

TB21

PACKET DATA CONVERGENCE PROTOCOL SERVICE DATA UNIT DISCARD METHOD AND USER EQUIPMENT

CROSS-REFERENCE TO RELATED APPLICATION

This application claims the priority benefit of U.S. provisional patent application Ser. No. 63/457,799, filed on Apr. 7, 2023. The entirety of the above-mentioned patent application is hereby incorporated by reference herein and made a part of this specification.

BACKGROUND

Technical Field

The present disclosure generally relates to a packet data convergence protocol (PDCP) Service Data Unit (SDU) discard method and a user equipment.

Description of Related Art

Extended Reality (XR) refers to all real-and-virtual combined environments and human-machine interactions generated by computer technology and wearables. In both uplink and downlink, XR-Awareness contributes to optimizations of gNB radio resource scheduling and relies at least on the notions of PDU Set and Data Burst (see FIG. 3): a PDU Set is composed of one or more PDUs carrying the payload of one unit of information generated at the application level (e.g. a frame or video slice), while a Data Burst is a set of data PDUs generated and sent by the application in a short period of time. A Data Burst can be composed of multiple PDUs belonging to one or multiple PDU Sets.

In some cases, network congestion occurs for XR uplink transmissions. At this time, the network device sends an XR congestion notification to inform a corresponding user equipment (UE), such that the UE may perform a PDCP SDU discard operation to discard PDUs.

SUMMARY

Exemplary embodiments of the disclosure provide a UL data discard method and a user equipment (UE).

According to one or more exemplary embodiments of the disclosure, a PDCP (Packet Data Convergence Protocol) Service Data Unit (SDU) discard method, adapted for a user equipment (UE), is provided. The method comprising: setting one or more discard timers based on a Radio Resource Control (RRC) configuration transmitted from a network device; receiving a PDCP SDU (Service Data Unit) from a upper layer, wherein the PDCP SDU corresponding to a PDU belonging to a PDU Set; and in response to receiving a PDU Set Importance (PSI)-based SDU discard indication from the network device, determining whether to discard the PDCP SDU or not according to a PDU Set Importance (PSI) of the PDU Set and a target discard timer. The step of determining whether to discard the PDCP SDU or not according to the PSI of the PDU Set and the target discard timer comprises: identifying the PSI of the PDU Set, wherein the PSI of the PDU Set indicates a relative importance of the PDU Set compared to other PDU Sets; determining the target discard timer corresponding to the PSI among the one or more discard timers; and discarding the PDCP SDU when the target discard timer is expired.

According to one or more exemplary embodiments of the disclosure, a UE comprises a transceiver, a memory, and a processor. The transceiver is used for transmitting or receiving signals. The memory is used for storing a program code. The processor is coupled to the transceiver and the memory. The processor is configured for executing the program to: set one or more discard timers based on a Radio Resource Control (RRC) configuration transmitted from a network device; receive a PDCP SDU (Service Data Unit) from a upper layer, wherein the PDCP SDU corresponding to a PDU belonging to a PDU Set; and in response to receiving a PDU Set Importance (PSI)-based SDU discard indication from the network device, determine whether to discard the PDCP SDU or not according to a PDU Set Importance (PSI) of the PDU Set and a target discard timer. The step of determine whether to discard the PDCP SDU or not according to the PSI of the PDU Set and the target discard timer comprises: identifying the PSI of the PDU Set, wherein the PSI of the PDU Set indicates a relative importance of the PDU Set compared to other PDU Sets; determining the target discard timer corresponding to the PSI among the one or more discard timers; and discarding the PDCP SDU when the target discard timer is expired.

In summary, the PDCP SDU discard method and the user equipment provided by the embodiments of the disclosure, are capable of setting and selecting alternative discard timer for performing PDCP discard operations based on the parameters, such as PSI, PSIHI, etc., so as to enhance, with the consideration of PSI and/or PSIHI, the PDCP SDU discard operation for UL data while receiving a PSI-based SDU discard indication. Therefore, the not-so-important and useless UL data can be discarded as soon as possible during the XR traffic congestion and the whole transmission for XR may be efficiently improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 10 is a flow chart of a step of determining the target discard timer corresponding to the PSI according to an exemplary embodiment of the present disclosure.

DESCRIPTION OF THE EMBODIMENTS

Figure 1:
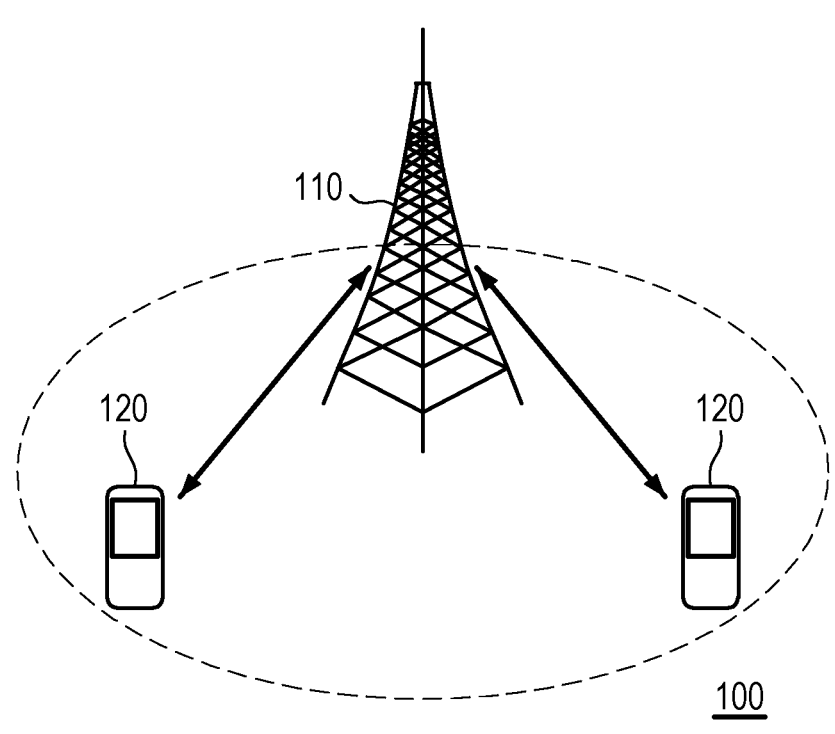
FIG. 1 is a schematic diagram that illustrates a communication system according to an exemplary embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

The abbreviations in the present disclosure are defined as follows and unless otherwise specified, the acronyms have the following meanings:

ABBREVIATION FULL NAME

ACK Acknowledgment
AF Application Function

AM Acknowledge Mode
AN Access Network
5G-AN PSDB 5G Access Network PSDB
ARQ Automatic Repeat-request
BSR Buffer Status Reporting
CE Control Element
CN Core Network
DL Downlink
DN Data Network
DRB Data Radio Bearer
HARQ HybridARQ
MAC Medium Access Control
MAC CE MAC Control Element
NG Next Generation
NGAP NG Application Protocol
PDCP Packet Data Convergence Protocol
PDU Protocol Data Unit
PSDB PDU Set Delay Budget
PSER PDU Set Error Rate
PSI PDU Set Importance
PSIHI PDU Set Integrated Handling Indication
QoS Quality of Service
RAN Radio Access Network
RLC Radio Link Control
RLF Radio Link Failure
RRC Radio Resource Control
SA2 SA
SDAP Service Data Adaptation Protocol
SDU Service Data Unit
SMF Session Management Function
UE User Equipment
UL Uplink
UM Unacknowledge Mode
UPF User Plane Function
XR Extended Reality
Some related technologies are introduced first.

"Configured" in this disclosure may be default/pre-defined/fixed/configured/activated/indicated/set, . . . , but not limited herein.

RRC in this disclosure may be replaced by MAC CE, DCI, . . . , but not limited herein.

Communication device in this disclosure may be represented by UE, or gNodeB, but not limited herein.

Combinations of embodiments disclosed in this disclosure is not precluded.

All steps in the embodiment may not be performed in a step-by-step way.

FIG. 1 is a schematic diagram that illustrates a communication system according to an exemplary embodiment of the present disclosure. Referring to FIG. 1, a communication system 100 (e.g., a Long Term Evolution (LTE) system, an LTE-Advanced (LTE-A) system, an LTE-Advanced Pro system, or a 5G NR Radio Access Network (RAN)) typically includes one or more network devices 110 and one or more UEs 120. The UE 120 communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more network devices 110.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A network device (or called base station, an NW device, or NW) may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A network device may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The network device may connect to serve the one or more UEs through a radio interface to the network.

The network device may be operable to provide radio coverage to a specific geographical area using a plurality of cells included in the RAN. The network device may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The network device may communicate with one or more UEs in the radio communication system through the plurality of cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

It should be understood that the terms "system" and "network" used in the disclosure are often used interchangeably. The term "and/or" in the disclosure is only an association relationship describing the associated objects, which means that there can be three kinds of relationships, for example, A and/or B, which can mean three situations: A is present alone, A and B are present simultaneously, or B is present alone. In addition, the character "/" in the disclosure generally indicates that the associated objects are in an "or" relationship.

Figure 2:
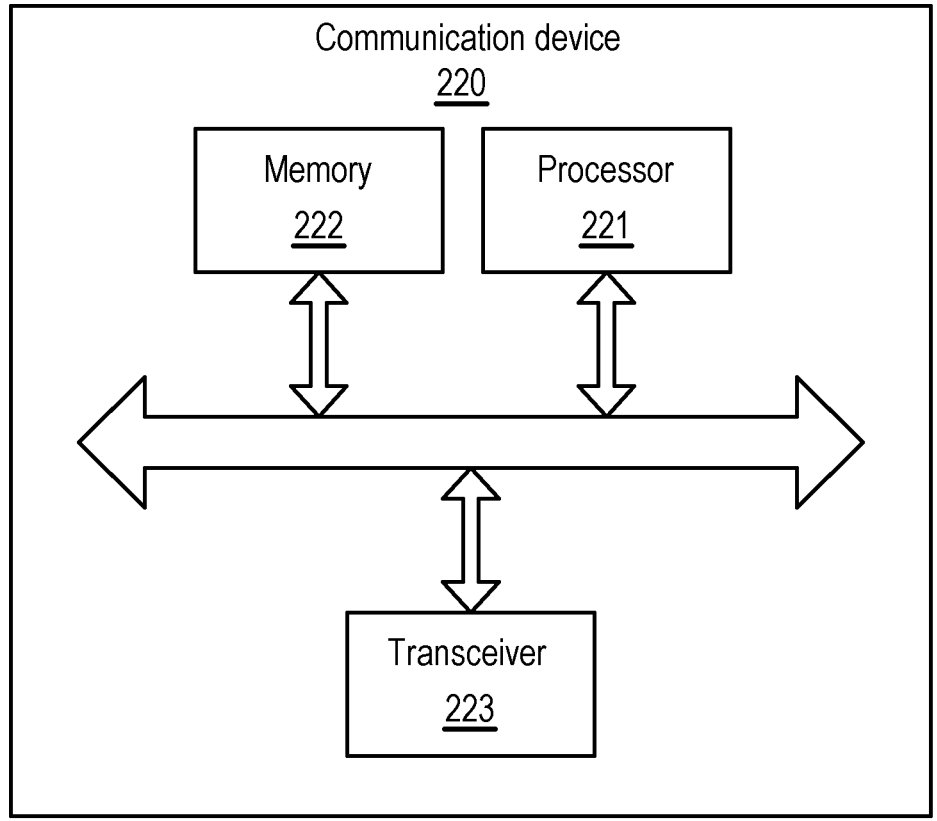
FIG. 2 is a block diagram that illustrates a communication device according to an exemplary embodiment of the present disclosure.

FIG. 2 is a block diagram that illustrates a communication device according to an exemplary embodiment of the present disclosure. Referring to FIG. 2, the communication device 220 may be a UE or a network device. The communication device 220 may include, but is not limited thereto a processor 221. The processor 221 (e.g., having processing circuitry) may include an intelligent hardware device, e.g., a Central Processing Unit (CPU), a microcontroller, an ASIC, and etc. The processor 221 can call and run a computer program from a memory to implement the method in the embodiment of the disclosure.

Since the program code stored in the communication device 220 adopts all the technical solutions of all the foregoing embodiments when being executed by the processor 221, it at least has all the advantageous effects brought by all the technical solutions of all the foregoing embodiments, and no further description is incorporated herein.

Optionally, as shown in FIG. 2, the communication device 220 may further include a memory 222. The memory 222 may include computer-storage media in the form of volatile and/or non-volatile memory. The memory 222 may be removable, non-removable, or a combination thereof. Exemplary memory includes solid-state memory, hard drives, optical-disc drives, and etc. The processor 221 may call and run a computer program from the memory 222 to implement the method in the embodiment of the disclosure.

The memory 222 may be a separate device independent of the processor 221, or may be integrated in the processor 221.

Optionally, as shown in FIG. 2, the communication device 220 may further include a transceiver 223, and the processor 221 may control the transceiver 223 to communicate with other devices. The transceiver 223 having a transmitter (e.g., transmitting/transmission circuitry) and a receiver (e.g., receiving/reception circuitry) may be configured to transmit and/or receive time and/or frequency resource partitioning information. In some implementations, the transceiver 3500 may be configured to transmit in different types of subframes and slots including, but not limited to, usable, non-usable and flexibly usable subframes and slot formats. The transceiver 223 may be configured to receive data and control channels.

Specifically, the transceiver 223 may send information or data to other devices, or receive information or data sent by other devices.

Specifically, the transceiver 223 may include a transmitter and a receiver. The transceiver 3530 may further include an antenna, and the number of antennas may be one or more.

Optionally, the communication device 220 may specifically be a network device in an embodiment of the disclosure, and the communication device 220 may implement the corresponding process implemented by the network device in various methods of the embodiment of the disclosure. For the conciseness, related descriptions are omitted.

Optionally, the communication device 220 may specifically be a mobile terminal, a terminal device, or a UE in an embodiment of the disclosure, and the communication device 220 may implement the corresponding process implemented by the mobile terminal, the terminal device, or the UE in various methods in the embodiment of the disclosure. For conciseness, related description is omitted.

Figure 3:
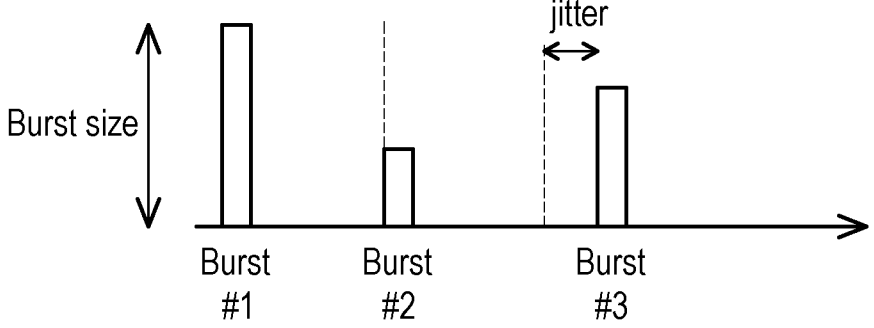
FIG. 3 is a schematic diagram that illustrates a data burst.

FIG. 3 is a schematic diagram that illustrates a data burst. Referring to FIG. 3, a Data Burst can be composed of multiple Protocol Data Units (PDUs) belonging to one or multiple PDU Sets. During a Data Burst, periods of data transmission inactivity should not be assumed. Although the duration of Data Bursts may vary, it can be assumed that it stays within the same order of magnitude.

Figure 4:
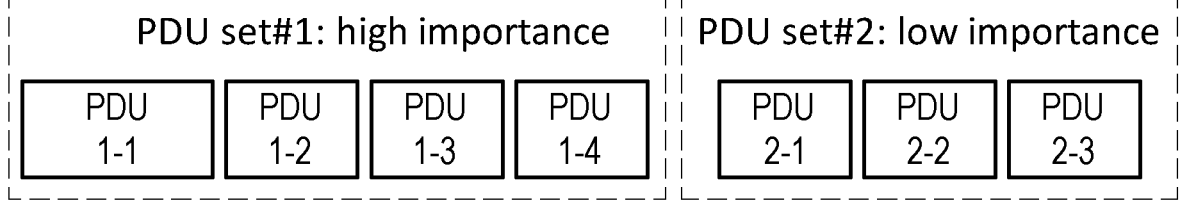
FIG. 4 is a schematic diagram that illustrates a PDU Set having high importance and a PDU Set having low importance.

FIG. 4 is a schematic diagram that illustrates a PDU Set having high importance and a PDU Set having low importance. Referring to FIG. 4, a PDU Set is considered as successfully delivered only when all PDUs of a PDU Set are delivered successfully, and if the PSER is available, the usage of PSER supersedes the usage of PER. UL data for the XR includes PDUs of PDU Set having higher importance (e.g., as illustrated by PDU set #1 in FIG. 4) and PDUs of PDU Set having lower importance (e.g., as illustrated by PDU set #2 in FIG. 4). The indication field for indicating importance of a PDU Set is also referred to as PDU Set Importance (PSI), and the value of PSI is from 0 to 15, wherein the less PSI value indicates the more important PDU Set. The number of PDUs in the high importance PDU Set may be more than the number of PDUs in the low importance PDU Set. The concept is similar to video streaming coding, for example, the video streaming may include I-frames (Intra-coding frames) and P-frames (Predictive-coding frames), wherein the size of the I-frame may be larger than the size of P-frame, and the importance of the I-frame is higher (e.g., PSI of PDU set #1 for I-frame is low) than the importance of P-frame (e.g., PSI of PDU set #2 for P-fame is high).

The UE 120 may obtain/identify parameters/configurations/information related to a PDU Set, the parameters/configurations/information are (provided by the CN to RAN), for example:

PDU Set Error Rate (PSER): defines an upper bound for a rate of non-congestion related PDU Set losses between RAN and the UE;

PDU Set Delay Budget (PSDB): time between reception of the first PDU (at the UPF in DL, at the UE in UL) and the successful delivery of the last arrived PDU of a PDU Set (at the UE in DL, at the UPF in UL), wherein PSDB is an optional parameter and when provided, the PSDB supersedes the PDB;

PDU Set Integrated Handling Indication (PSIHI): indicates whether all PDUs of the PDU Set are needed for the usage of PDU Set by application layer;

PDU Set Information and Identification (dynamic information for DL provided by user plane in GTP-U header): PDU Set Sequence Number, PDU Set Size in bytes (FFS), PDU SN within a PDU Set, Indication of End PDU of the PDU Set, PDU Set Importance (PSI), wherein the PSI identifies the relative importance of a PDU Set compared to other PDU Sets, and RAN may use it for PDU Set level packet discarding in presence of congestion; and End of Data Burst indication in the header of the last PDU of the Data Burst (optional).

Figure 5:
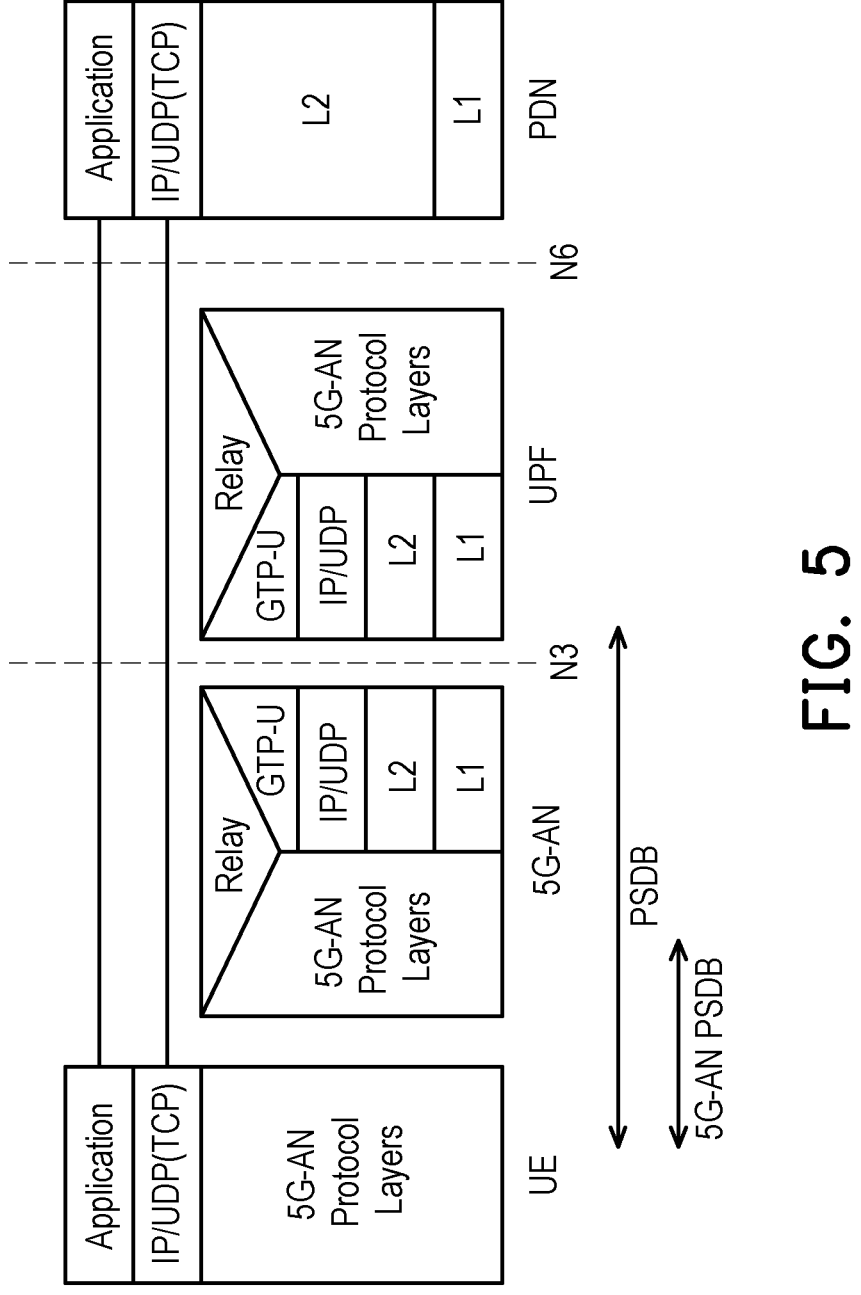
FIG. 5 is a schematic diagram that illustrates PDU Set Delay Budget (PSDB) and access network PSDB (5G-AN PSDB).

PSER, PSDB, and PSIHI are PDU Set QoS parameters of the QoS flow (i.e. applicable to all PDU Sets of the QoS flow) provided by the SMF via NGAP. gNB takes PSDB as a reference to decide the value of discard timer at PDCP. In an embodiment, 5G-AN PSDB (5G Access Network PSDB) is defined as the PSDB specified for Uu interface in RAN (See FIG. 5). All the PDU Sets within one QoS flow should apply the same PSER, PSDB and PSIHI. The PDU Set importance of the different PDU Sets within one QoS flow can be different.

For the uplink XR traffic, the UE needs to be able to identify PDU Set and Data Bursts dynamically, including PSI, but in-band marking over Uu of PDUs is not needed.

Based on following concept, method for performing the PDCP discard operation is provided for XR traffic according to one or more exemplary embodiments below: (1) SA2 had agreed that the PDU Set importance of the different PDU Sets within one QoS flow can be different. Thus, PDCP SDU discard according to PDU Set Importance needs to be enhanced within a DRB. (2) PDCP SDU discard needs to consider PSIHI to free radio resource as soon as possible for the UL RAN congestion. (3) All the UL IP packets in a PDU Set will arrive at the UE buffer at the same instance can not be assumed because all devices will not have powerful processing capabilities and high-end encoders. The granularity of the discard operation at PDCP in the transmitter should be PDU Set (e.g., 5G-AN PSDB), not PDU (e.g., 5G-AN PDB).

Figure 6A:
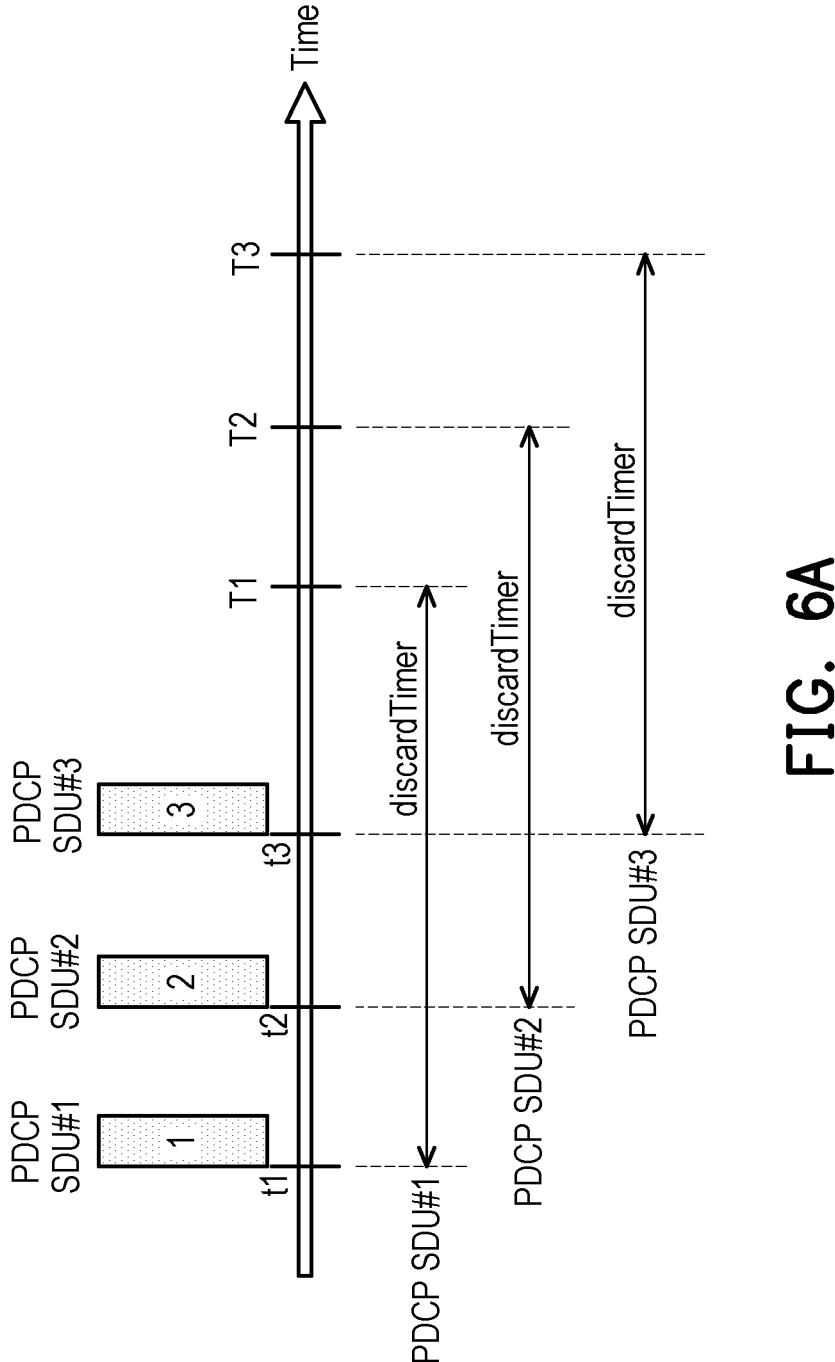
FIG. 6A is a schematic diagram that illustrates PDCP SDUs and corresponding discard timers.

FIG. 6A is a schematic diagram that illustrates PDCP SDU (Service Data Unit)s and corresponding discard timers. Referring to FIG. 6A, assuming that PDU SDU #1 to PDU SDU #3 are respectively corresponding to three PDUs that are not belonging to the same one PDU Set, and the receiving time of PDCP SDU #1 to PDCP SDU #3 are t1 to t3. In this case, a duration of a discard timer for each PDCP SDU is configured/set by a default value (e.g., discardTimer) indicated by obtained RRC configuration. In other words, the expiration time of PDCP SDU #1 to PDCP SDU #3 are T1 to T3. When receiving each PDCP SDU, the discard timer corresponding to the received PDCDP SDU is started until expired.

Figure 6B:
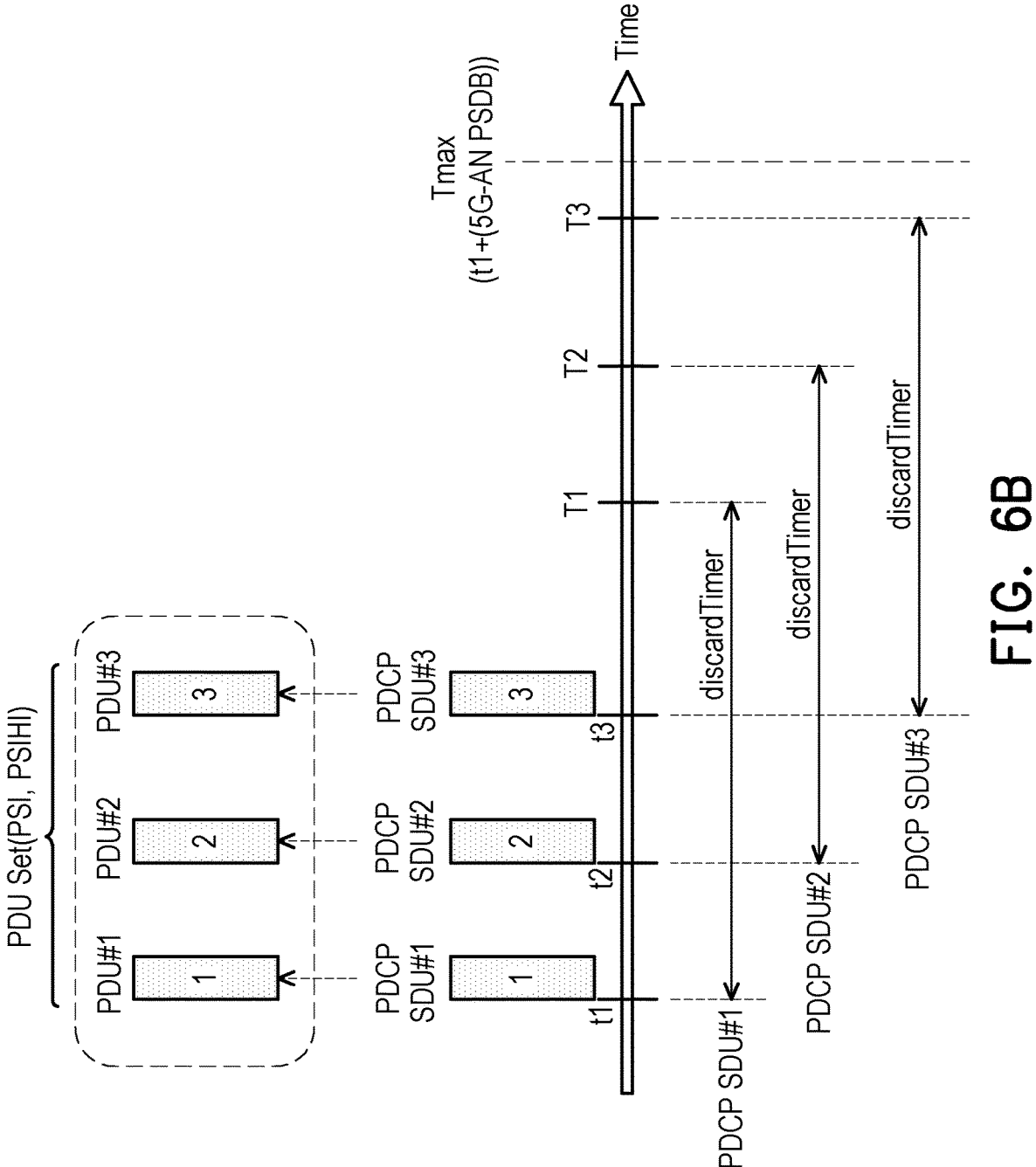
FIG. 6B is a schematic diagram that illustrates PDCP SDUs, corresponding discard timers and 5G-AN PSDB according to an exemplary embodiment of the present disclosure.

FIG. 6B is a schematic diagram that illustrates PDCP SDUs, corresponding discard timers and 5G-AN PSDB according to an exemplary embodiment of the present disclosure. Referring to FIG. 6B, in an exemplary embodiment, PDCP SDUs (e.g., PDCP SDU #1 to PDCP SDU #3) are corresponding to PDUs (e.g., PDU #1 to PDU #3) belonging to the same PDU Set. In this case, the granularity discard operation is whole PDU Set rather than individual PDU. In other words, when a discard timer for this PDU Set is expired, the whole PDU Set should be discarded (no matter how many PDUs are remained, the remaining PDU(s) would be discarded). The duration of the discard timer for whole PDU Set is configured according to discardTimer and the 5G-AN PSDB. That is, the maximum expiration time for whole PDU Set is calculated by summing the receiving time (i.e., t1) of the first one PDCP SDU and 5G-AN PSDB, and the expiration time for each PDCP SDU cannot exceed this maximum expiration time.

Figure 7:
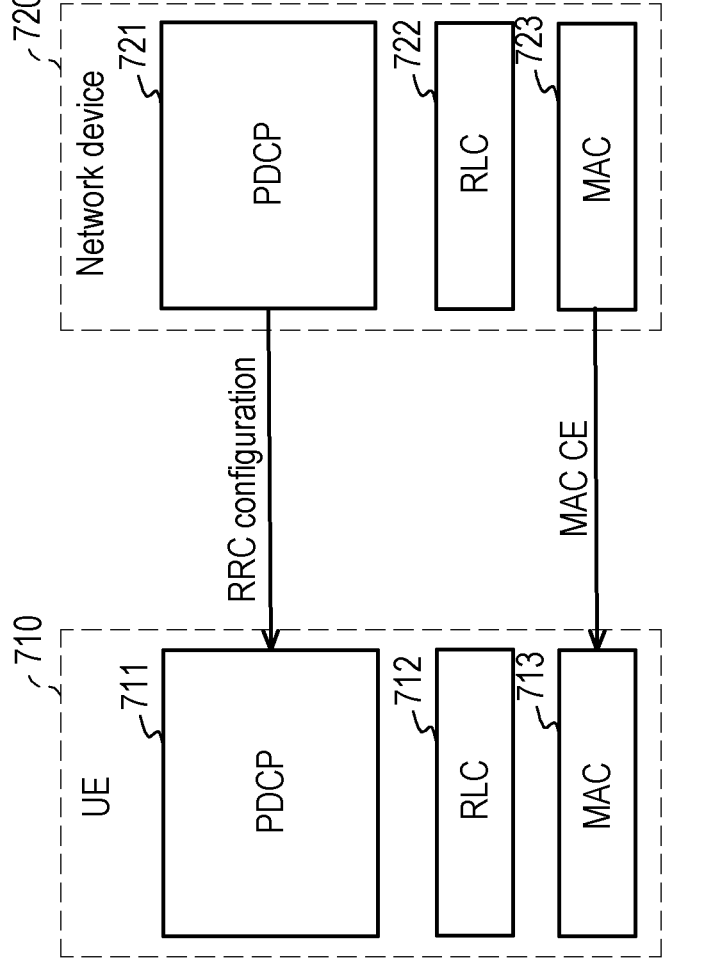
FIG. 7 illustrates a system block diagram of PSI-based SDU discard operation.

FIG. 7 illustrates a system block diagram of PSI-based SDU discard operation. Referring to FIG. 7, UE 710 includes PDCP layer (entity) 711, RLC layer 712 and MAC layer 713. Network device 720 (e.g., gNB) includes PDCP layer 721, RLC layer 722 and MAC layer 723. In an exemplary embodiment, the configuration of one or more alternative discard timers for PSI-based discard via RRC signaling from PDCP layer 721 to PDCP layer 711. RRC configures each PDCP entity with timer, discardTimer, ENUMERATED {ms10, ms20, . . . , infinity}.

Furthermore, MAC CE for the activation/deactivation of the PSI-based discard is sent from MAC 723 to MAC 713. In one embodiment, operations related to a timer-based PDCP SDU discard with PSIHI consideration are performed by PDCP layer 711. PDCP entity runs a timer (discardTimer) for each PDCP SDU. This timer is configured only for DRBs. The duration of the timer may be decided by upper layers (e.g., 5G-AN PSDB). In the transmitting side, a new timer for a PDCP SDU is started upon reception of a PDCP SDU from upper layer.

To facilitate understanding of the technical solutions of the embodiments of the disclosure, the technical concepts related to the embodiments of the disclosure are described below.

Figure 8:
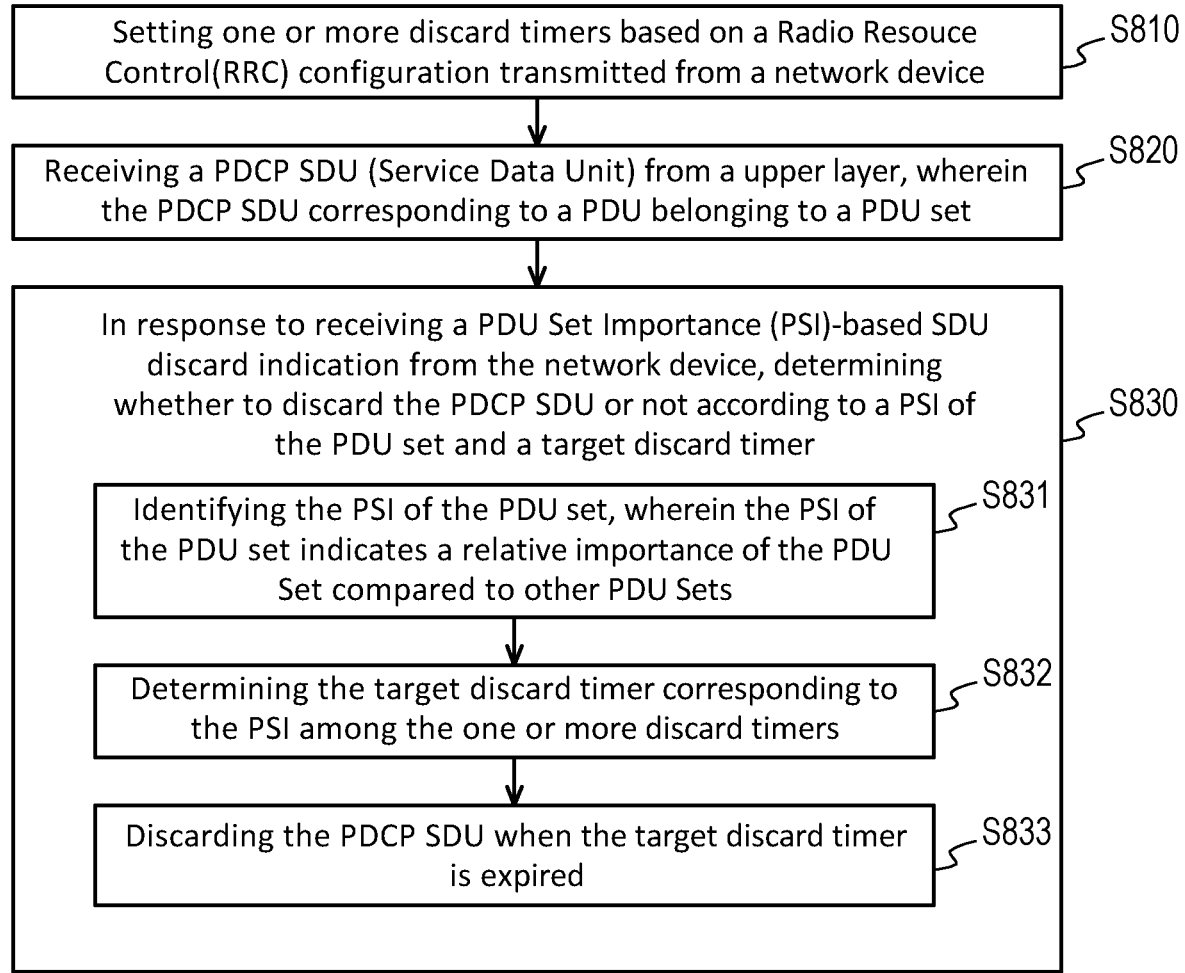
FIG. 8 is a flow chart of a method for performing a PDCP (Packet Data Convergence Protocol) discard operation according to an exemplary embodiment of the present disclosure.

FIG. 8 is a flow chart of a method for performing a PDCP (Packet Data Convergence Protocol) discard operation according to an exemplary embodiment of the present disclosure. Referring to FIG. 8, in step S810, processor of UE is configured to set one or more discard timers based on a Radio Resource Control (RRC) configuration transmitted from a network device. In the exemplary embodiments mentioned below, the alternative discard timers set according to different conditions are described, wherein the RRC configuration includes information/parameters indicating these conditions. Then, the processor of UE may select proper discard timer (target discard timer) to a received PDCP SDU for the PDCP SDU discard operation.

Next, in step S820, the processor of UE receives a PDCP SDU from a upper layer (e.g., SDAP), wherein the PDCP SDU corresponding to a PDU belonging to a PDU Set. In an embodiment, the PDCP SDU is used for UL data transmission for XR.

Next, in step S830, the processor of UE is further configured to: in response to receiving a PDU Set Importance (PSI)-based SDU discard indication from the network device, determining whether to discard the PDCP SDU or not according to a PSI of the PDU Set and a target discard timer.

In an exemplary embodiment, step S830 comprises steps S831 to S833.

In step S831, the processor of UE has a capability to identifying the PSI of the PDU Set, wherein the PSI of the PDU Set indicates a relative importance of the PDU Set compared to other PDU Sets. In this step (step S831), the processor first identifies the PSI of the PDU Set corresponding to the received PDCP SDU, so as to decide the proper corresponding alternative discard timer based on the identified PSI in next step (step S832). Identification of PSI of a PDU Set and determination of low importance PDU Set are left up to UE implementation.

Next, in step S832, the processor of UE is further configured to determine the target discard timer corresponding to the PSI among the one or more discard timers.

Next, in step S833, the processor of UE is further configured to discard the PDCP SDU when the target discard timer is expired.

In an exemplary embodiment, the duration of an alternative discard timer for PDCP SDU corresponding to an important PDU Set (e.g., PDU Set having low PSI value) is configured as infinity. A PDCP SDU corresponding to a PDU belonging to a PDU Set having high importance is also called as the PDCP SDU corresponding to a high-importance PDU Set. In another embodiment, duration of an alternative discard timer for PDCP SDU corresponding a high-importance PDU Set is configured as a time length longer than the default value of discardTimer indicated by RRC configuration.

In other words, the step (step S832) of determining the target discard timer corresponding to the PSI among the one or more discard timers comprises: when the PSI is identified as high importance, selecting the target discard timer of which a duration is configured as infinity; and when the PSI is identified as low importance, selecting the target discard timer of which a duration is configured as a default value, wherein the default value is indicated by the RRC configuration, wherein the target discard timer is started when receiving the PDCP SDU.

Figure 9:
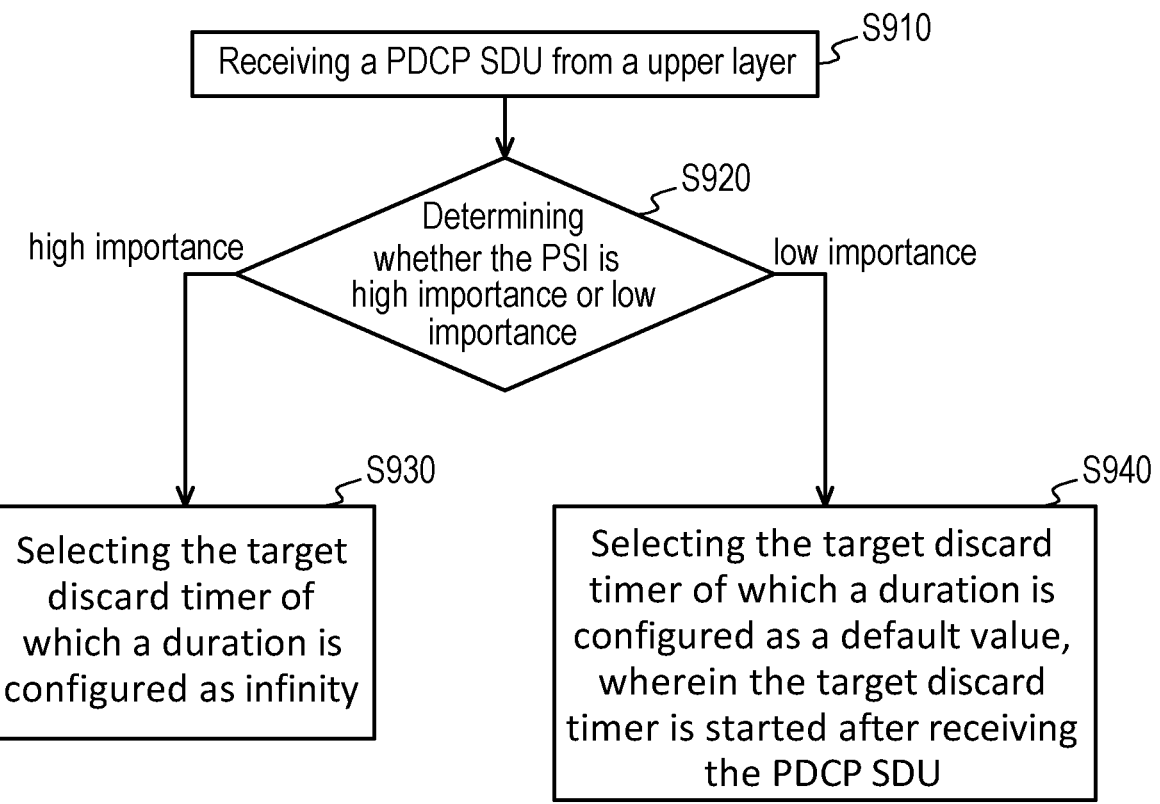
FIG. 9 is a flow chart of a step of determining the target discard timer corresponding to the PSI according to an exemplary embodiment of the present disclosure.

For example, FIG. 9 is a flow chart of a step of determining the target discard timer corresponding to the PSI according to an exemplary embodiment of the present disclosure. Referring to FIG. 9, in step S910, the processor receives a PDCP SDU from a upper layer. Next, in step S920, the processor determines whether the PSI is high importance or low importance. In response to determining that the PSI is high importance, continues to perform step S930; in response to determining that the PSI is low importance, continues to perform step S940. In step S930, the processor selects the target discard timer of which a duration is configured as infinity. In step S940, the processor selects the target discard timer of which a duration is configured as a default value. In this embodiment, the target discard timer is started after receiving the PDCP SDU.

In an exemplary embodiment, the duration of an alternative discard timer (target discard timer) for high-importance PDCP SDU is configured according to a predetermined offset (discardTimerOffset) which is indicated by RRC configuration. Specifically, the target discard timer for high-importance PDCD SDU is configured as a summation of the default value and the predetermined offset (e.g., discardTimer=discardTimer+discardTimerOffset). Furthermore, the target discard timer for low-importance PDCD SDU is configured as the default value, discardTimer.

In other words, the step (step S832) of determining the target discard timer corresponding to the PSI among the one or more discard timers comprises: when the PSI is identified as high importance, selecting the target discard timer of which a duration is configured as a first value according to a default value and a discard-Timer-Offset indicated by the RRC configuration; and when the PSI is identified as low importance, selecting the target discard timer of which a duration is configured as a second value according to the default value indicated by the RRC configuration, wherein the second value is less than the first value, wherein the target discard timer is started when receiving the PDCP SDU.

FIG. 10 is a flow chart of a step of determining the target discard timer corresponding to the PSI according to an exemplary embodiment of the present disclosure. Referring to FIG. 10, in step S1010, the processor receives a PDCP SDU from a upper layer. Next, in step S1020, the processor determines whether the PSI is high importance or low importance. In response to determining that the PSI is high importance, continues to perform step S1030; in response to determining that the PSI is low importance, continues to perform step S1040. In step S1030, the processor selects the target discard timer of which a duration is configured as a first value according to a default value and a discard-Timer-Offset indicated by the RRC configuration. In step S1040, the processor selects the target discard timer of which a duration is configured as a second value according to the default value indicated by the RRC configuration, wherein the second value is less than the first value. In this embodiment, the target discard timer is started after receiving the PDCP SDU. In one embodiment, the first value is the summation of the default value and the discard-Timer-Offset indicated by the RRC configuration, and the second value is the default value. In another embodiment, the first value is the default value, and the second value is a calculation result obtained by the default value minus the discard-Timer-Offset. It should be noted that the second value (for the target discard timer of low importance) is need to be smaller than the first value (for the target discard timer of high importance).

Figure 11:
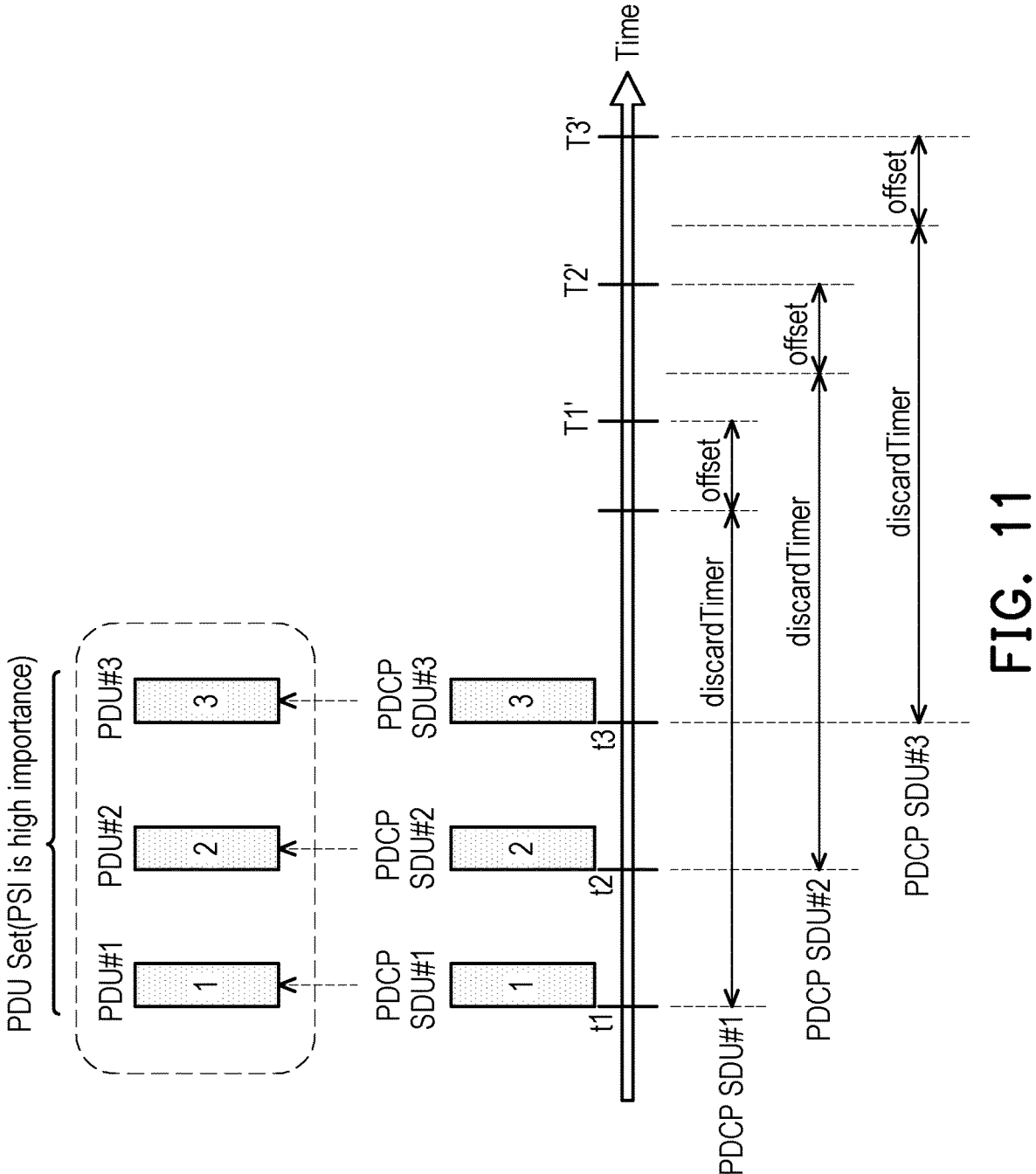
FIG. 11 is a schematic diagram that illustrates PDCP SDUs corresponding to a PDU Set and corresponding discard timers configured according to a default value and a discardTimerOffset according to an exemplary embodiment of the present disclosure.

FIG. 11 is a schematic diagram that illustrates PDCP SDUs corresponding to a PDU Set and corresponding discard timers configured according to a default value and a discardTimerOffset according to an exemplary embodiment of the present disclosure. For example, referring to FIG. 11, in an exemplary embodiment, PDCP SDUs (e.g., PDCP SDU #1 to PDCP SDU #3) are corresponding to PDUs (e.g., PDU #1 to PDU #3) belonging to the same PDU Set. Assuming that the PDU Set's PSI is high importance, and the receiving time of PDCP SDU #1 to PDCP SDU #3 are t1 to t3. The duration of each target discard timer for each PDCP SDU is configured according to discardTimer and predetermined offset (i.e., the summation of discardTimer and predetermined offset). In other words, the expiration time of PDCP SDU #1 to PDCP SDU #3 are T1' to T3'. In one embodiment, when the target discard timer is expired the processor discard the PDCP SDU.

In an exemplary embodiment, the PSI comprises a plurality of PSI levels, the target discard timer is determined according to the PSI.

In other words, the step (S832) of determining the target discard timer corresponding to the PSI among the one or more discard timers includes: selecting the target discard timer of which a duration is configured by: setting a discard-Timer-Offset based on an identified PSI level of the PSI; and setting the duration of the target discard timer corresponding to the PSI as a sum of the discard-Timer-Offset and a default value, wherein the default value and the discard-Timer-Offset are indicated by the RRC configuration, wherein the target discard timer is started when receiving the PDCP SDU.

Figure 12:
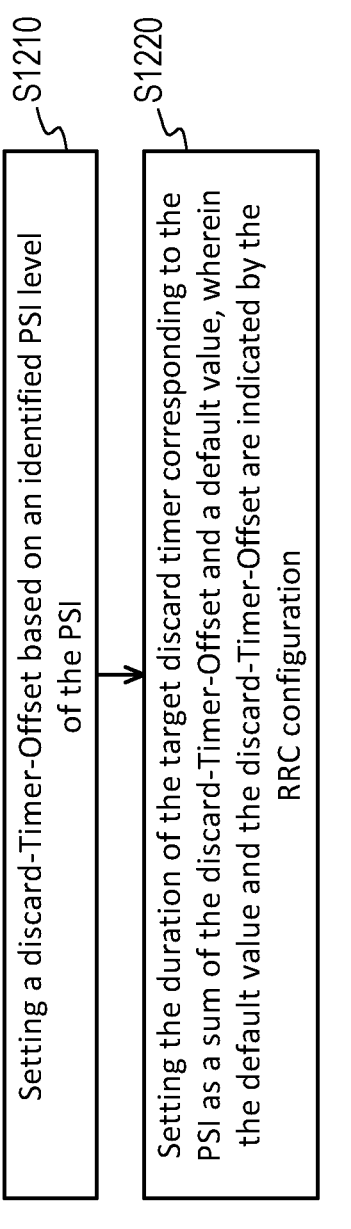
FIG. 12 is a flow chart of setting target discard timer corresponding to the PSI of a PDU Set based on PSI levels according to an exemplary embodiment of the present disclosure.

FIG. 12 is a flow chart of setting target discard timer corresponding to the PSI of a PDU Set based on PSI levels according to an exemplary embodiment of the present disclosure. For example, referring to FIG. 12, in step S1210, the processor sets a discard-Timer-Offset based on an identified PSI level of the PSI. Next, in step S1220, the processor sets the duration of the target discard timer corresponding to the PSI as a sum of the discard-Timer-Offset and a default value, wherein the default value and the discard-Timer-Offset are indicated by the RRC configuration.

Figure 13:
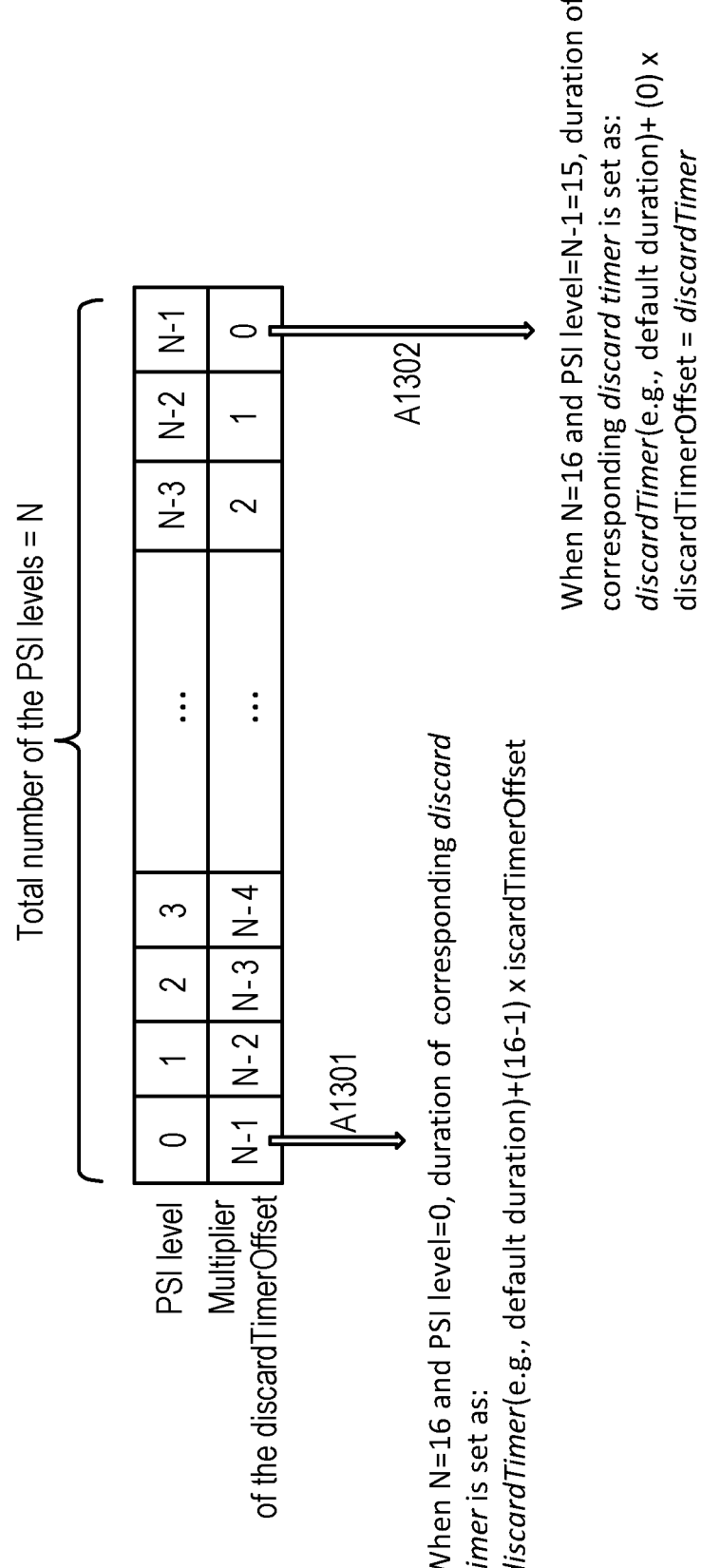
FIG. 13 is a schematic diagram that illustrates PSI levels and corresponding multipliers of the discardTimerOffset according to a default value and a discardTimerOffset according to an exemplary embodiment of the present disclosure.

FIG. 13 is a schematic diagram that illustrates PSI levels and corresponding multipliers of the discardTimerOffset according to a default value and a discardTimerOffset. In more detail, referring to FIG. 13, assuming that the total number of PSI levels is N, e.g., PSI levels are 0 to (N−1), and the respectively corresponding multipliers of the discard-TimerOffset are (N−1) to 0. For example, as illustrated by arrow A1301, When PSI level=0 and N=16, duration of the corresponding target discard timer is set as discardTimer (e.g., default duration)+(16−1)*discardTimerOffset; as illustrated by arrow A1302, When PSI level=N−1=15 and N=16, duration of the corresponding target discard timer is set as discardTimer (e.g., default duration)+(0) *discardTimerOffset=discardTimer. The value of discard-TimerOffset is indicated by RRC configuration. In one embodiment, when the target discard timer is expired the processor discard the PDCP SDU.

In an exemplary embodiment, the discard operation is executes by considering the setting of PSIHI of the PDU set to which the PDCP SDU belongs. For a PDU Set in a QoS flow for which the PSIHI is set, when one PDCP SDU corresponding to a PDU set is known to either be lost or be discarded, all remaining PDUs of that PDU Set could be discarded at the transmitter to free up radio resources. In other words, when the PSIHI is set for a QoS flow, as soon as one PDU of a PDU Set is known to be lost or discarded, the remaining PDUs of that PDU Set can be considered as no longer needed by the application and may be subject to discard operation.

In a scenario that the processor (PDCP entity) determines that the corresponding target discard timer is expired, the processor discard the PDCP SDU and then further discards the remaining PDCP SDUs which belong to the same PDU Set if the PSIHI of the PDU Set is set.

In other words, after discarding the PDCP SDU corresponding to the PDU Set, the PDCP SDU discard method further includes: determining whether PDU Set Integrated Handling Indication (PSIHI) corresponding to the PDU Set is set or not; in response to determining that the PSIHI is set, discarding remaining one or more PDCP SDUs of the PDU Set to which the PDCP SDU belongs; and in response to determining that the PSIHI is not set, not discarding remaining one or more PDCP SDUs of the PDU Set to which the PDCP SDU belongs.

Figure 14:
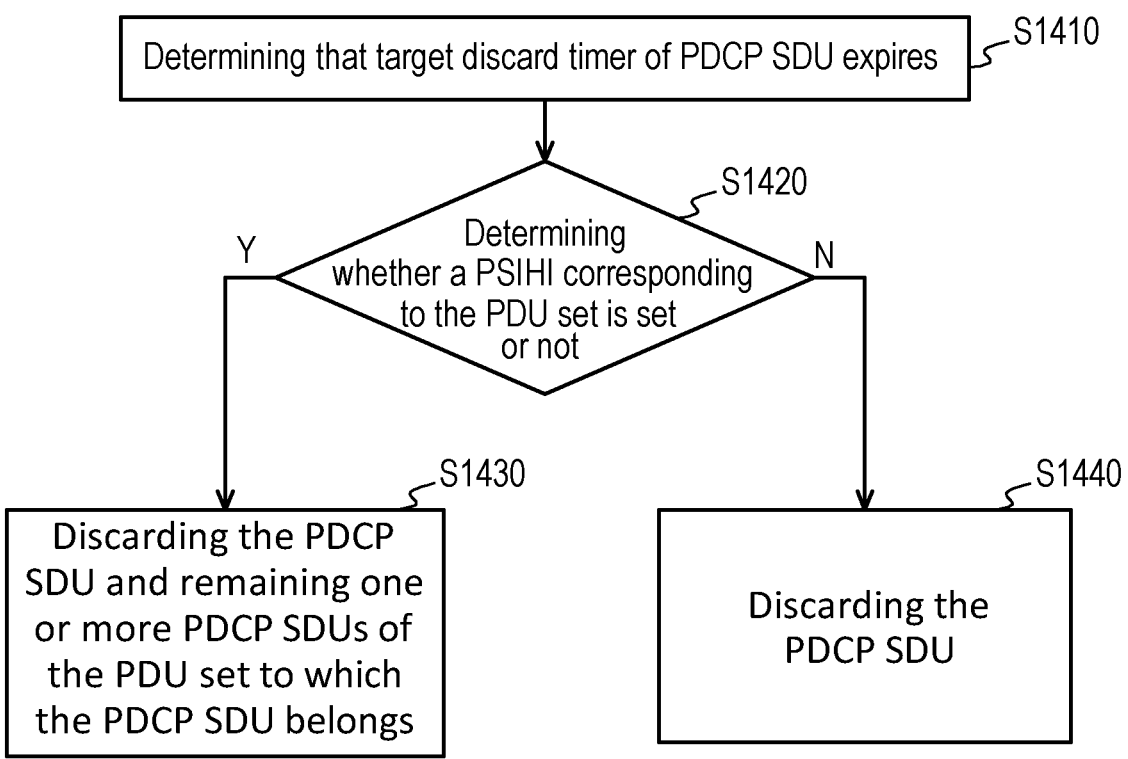
FIG. 14 is a flow chart of a step of determining whether to discard the PDCP SDU or not based on PSIHI when target discard timer of the PDCP SDU expires according to an exemplary embodiment of the present disclosure.

FIG. 14 is a flow chart of a step of determining whether to discard the PDCP SDU or not based on PSIHI when the target discard timer of the PDCP SDU expires according to an exemplary embodiment of the present disclosure. Fox example, referring to FIG. 14, in step S1410, the processor determines that target discard timer of PDCP SDU expires (e.g., when the target discard timer of the PDCP SDU expires). Next, in step S1420, the processor determines whether a PSIHI corresponding to the PDU Set is set or not. In response to determining that the PSIHI corresponding to the PDU Set is set, continues to step S1430; else, continues to step S1440. In step S1430, the processor discards the PDCP SDU and remaining one or more PDCP SDUs of the PDU Set to which the PDCP SDU belongs. In step S1440, the processor discards the PDCP SDU (does not discard remaining one or more PDCP SDUs of the PDU Set to which the PDCP SDU belongs).

In one embodiment, the processor scans the buffer to find the PDUs belong to the same PDU Set, and then removes these remaining corresponding PDCP SDUs from corresponding buffers.

In an exemplary embodiment, the duration of target discard timer for each PDCP SDU is set by considering the 5G-AN PSDB. The expiration time for all PDCP SDUs belonging to the same PDU Set are the same.

In this embodiment, the step (S832) of determining the target discard timer corresponding to the PSI among the one or more discard timers includes: when the PSI is identified as high importance, selecting the target discard timer of which a duration is configured as a first value according to a default value and a discard-Timer-Offset indicated by the RRC configuration and a time interval between receiving the PDCP SDU and receiving first one PDCP SDU of the PDU Set; and when the PSI is identified as low importance, selecting the target discard timer of which a duration is configured as a second value according to the default value indicated by the RRC configuration and the time interval between receiving the PDCP SDU and receiving first one PDCP SDU of the PDU Set, wherein the second value is less than the first value, wherein the target discard timer is started when receiving the PDCP SDU.

Specifically, the duration of the target discard timer for PDCP SDU #i corresponding to high-importance PDU Set is set as discardTimer-(t1-ti)+discardTimerOffset; the duration of the target discard timer for PDCP SDU #i corresponding to low-importance PDU Set is set as discardTimer-(t1-ti). Where, t1 is the receiving time of the first one PDCP SDU (e.g., PDCP SDU #1) corresponding to the PDU Set, and ti is the receiving time of the $i^{th}$ PDCP SDU corresponding to the PDU Set, and (ti-t1) is the time interval between the receiving time ti and the receiving time t1. That is, by setting the duration of target discard timer for each PDCP SDU based on the consideration of 5G-AN PSDB, the expiration time for each PDCP SDUbelonging to the same PDU Set is the same.

Figure 15:
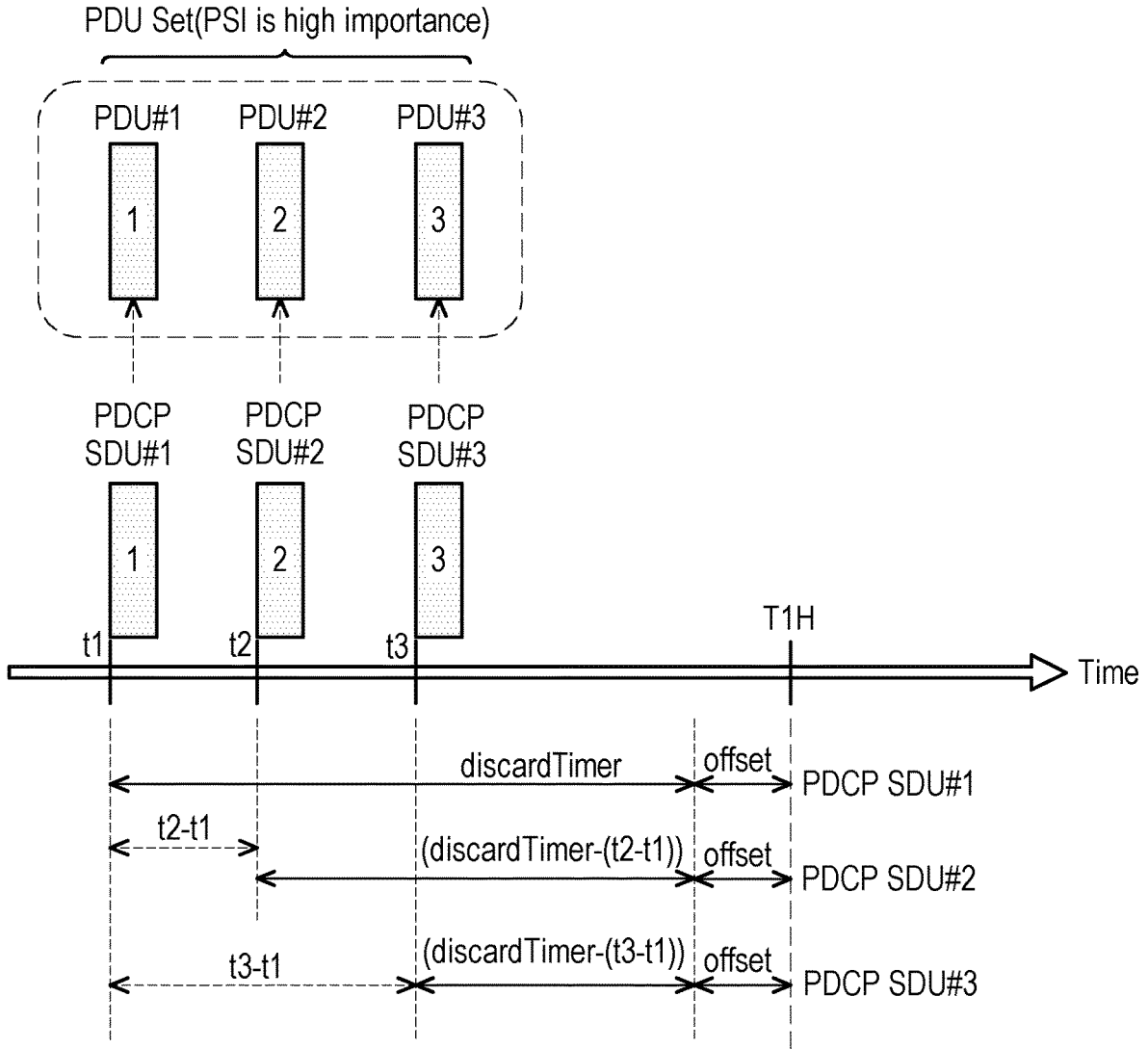
FIG. 15 is a schematic diagram that illustrates PDCP SDUs corresponding to a high importance PDU Set and corresponding discard timers configured according to a default value and a time interval according to an exemplary embodiment of the present disclosure.

FIG. 15 is a schematic diagram that illustrates PDCP SDUs corresponding to a high importance PDU Set and corresponding discard timers configured according to a default value and a time interval according to an exemplary embodiment of the present disclosure. For example, referring to FIG. 15, assuming that PDCP SDUs (e.g., PDCP SDU #1 to PDCP SDU #3) are corresponding to PDUs (e.g., PDU #1 to PDU #3) belonging to the same PDU Set. Further assuming that the PDU Set's PSI is high importance, and the receiving time of PDCP SDU #1 to PDCP SDU #3 are t1 to t3. The duration of each target discard timer for PDCP SDU #i is configured according to discardTimer, predetermined offset and the time interval between SDU #1 and SDU #i. In this case, the duration of the target discard timer for PDCP SDU #1 is set as discardTimer+offset; the duration of the target discard timer for PDCP SDU #2 (i=2) is set as discardTimer-(time interval, t2-t1)+offset; the duration of the target discard timer for PDCP SDU #3 is set as discard-Timer-(time interval, t3-t1)+offset. That is, the expiration time of each of PDCP SDU #1 to PDCP SDU #3 is the same (e.g., time T1H). The expiration time T1H cannot be set to be larger than the maximum expiration time Tmax (illustrated in FIG. 6B) calculated by t1+5G-AN PSDB. In one embodiment, when the target discard timer is expired the processor discard the PDCP SDU.

Figure 16:
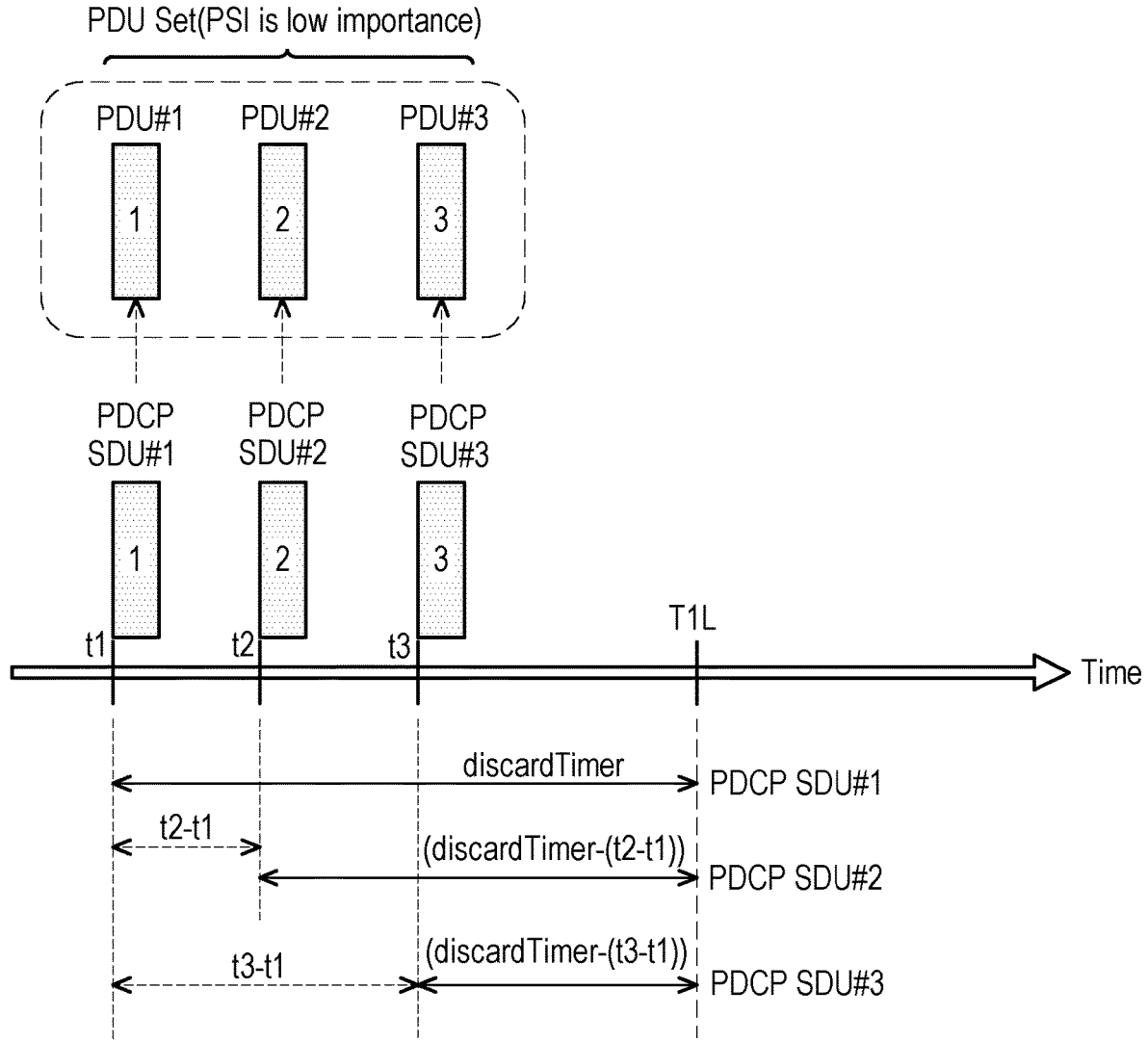
FIG. 16 is a schematic diagram that illustrates PDCP SDUs corresponding to a low importance PDU Set and corresponding discard timers configured according to a default value and a time interval according to an exemplary embodiment of the present disclosure.

FIG. 16 is a schematic diagram that illustrates PDCP SDUs corresponding to a low importance PDU Set and corresponding discard timers configured according to a default value and a time interval according to an exemplary embodiment of the present disclosure. For example, referring to FIG. 16, assuming that PDCP SDUs (e.g., PDCP SDU #1 to PDCP SDU #3) are corresponding to PDUs (e.g., PDU #1 to PDU #3) belonging to the same PDU Set. Further assuming that the PDU Set's PSI is low importance, and the receiving time of PDCP SDU #1 to PDCP SDU #3 are t1 to t3. The duration of each target discard timer for PDCP SDU #i is configured according to discardTimer and the time interval between SDU #1 and SDU #i. In this case, the duration of the target discard timer for PDCP SDU #1 is set as discardTimer; the duration of the target discard timer for PDCP SDU #2 (i=2) is set as discardTimer-(time interval, t2-t1); the duration of the target discard timer for PDCP SDU #3 is set as discardTimer-(time interval, t3-t1). That is, the expiration time of each of PDCP SDU #1 to PDCP SDU #3 is the same (e.g., time T1L). The expiration time T1L cannot be set to be larger than the maximum expiration time Tmax (illustrated in FIG. 6B) calculated by t1+5G-AN PSDB. In one embodiment, when the target discard timer is expired the processor discard the PDCP SDU.

In an exemplary embodiment, the step of determining the target discard timer corresponding to the PSI among the one or more discard timers includes: when the PSI is identified as high importance, selecting the target discard timer of which a duration is configured as a first value according to a default value and a discard-Timer-Offset indicated by the RRC configuration and a time interval between receiving the PDCP SDU and receiving first one PDCP SDU of the PDU Set; and when the PSI is identified as low importance, selecting the target discard timer of which a duration is configured as a second value according to the default value indicated by the RRC configuration and the time interval between receiving the PDCP SDU and receiving first one PDCP SDU of the PDU Set, wherein the second value is less than the first value, wherein the target discard timer is started when receiving the PDCP SDU. Furthermore, when discarding the PDCP SDU, the PDCP SDU discard method further includes: determining whether PDU Set Integrated Handling Indication (PSIHI) corresponding to the PDU Set is set or not; in response to determining that the PSIHI is set, discarding remaining one or more PDCP SDUs of the PDU Set to which the PDCP SDU belongs; and in response to determining that the PSIHI is not set, not discarding remaining one or more PDCP SDUs of the PDU Set to which the PDCP SDU belongs.

Figure 17:
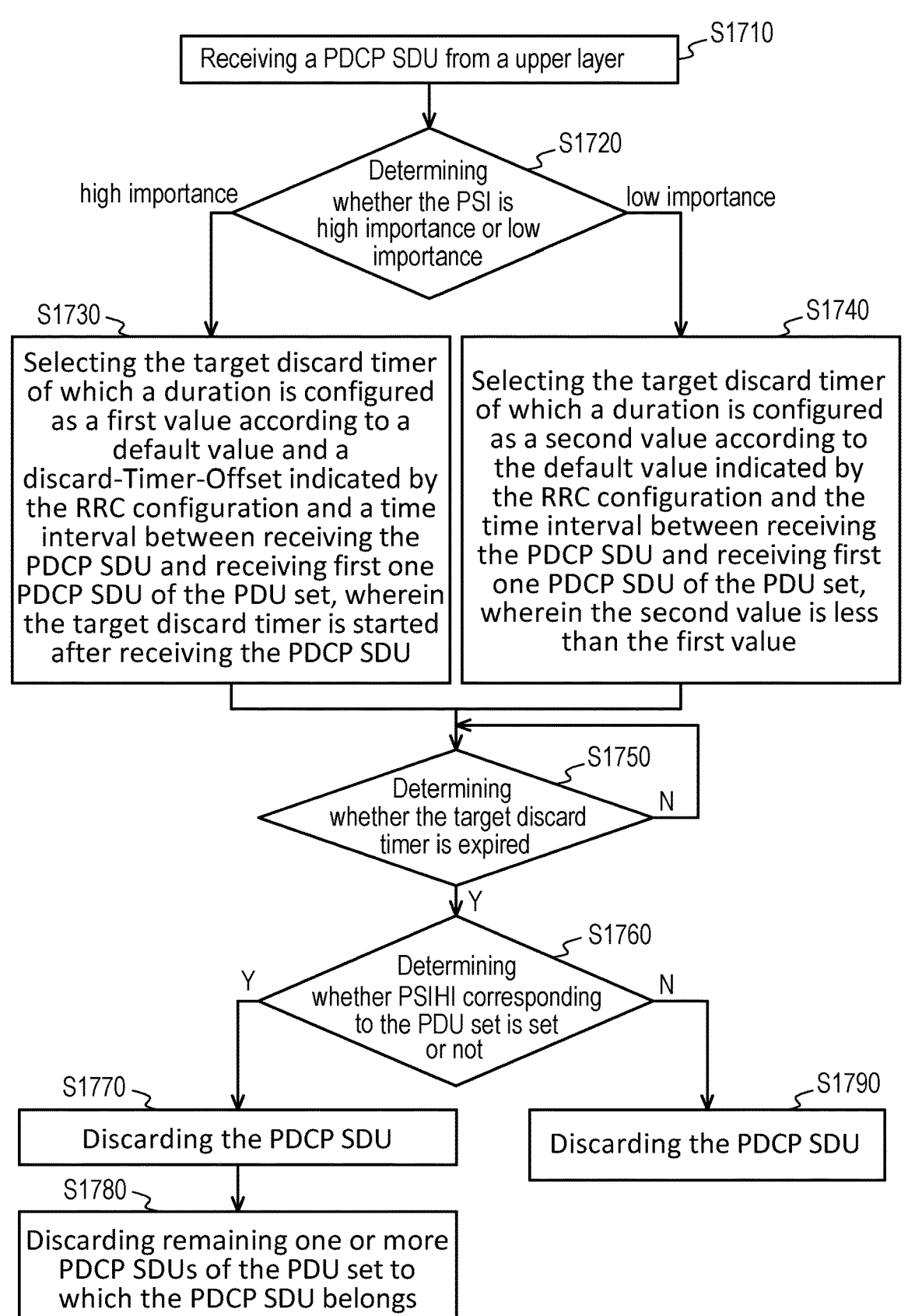
FIG. 17 is a flow chart of a PDCP SDU discard operation based on PSI and PSIHI according to an exemplary embodiment of the present disclosure.

FIG. 17 is a flow chart of a PDCP SDU discard operation based on PSI and PSIHI according to an exemplary embodiment of the present disclosure. For example, referring to FIG. 17, in step S1710, the processor receives a PDCP SDU from a upper layer. Next, in step S1720, the processor determines whether the PSI is high importance or low importance. In response to determining that the PSI is high importance, in step S1730, the processor selects the target discard timer of which a duration is configured as a first value according to a default value and a discard-Timer-Offset indicated by the RRC configuration and a time interval between receiving the PDCP SDU and receiving first one PDCP SDU of the PDU Set, wherein the target discard timer is started after receiving the PDCP SDU. In response to determining that the PSI is low importance, in step S1740, the processor selects the target discard timer of which a duration is configured as a second value according to the default value indicated by the RRC configuration and the time interval between receiving the PDCP SDU and receiving first one PDCP SDU of the PDU Set, wherein the second value is less than the first value.

Next, in step S1750, the processor determines whether the target discard timer is expired. In response to determining that the target discard timer is not expired, back to step S1750. In response to determining that the target discard timer is expired, in step S1760, the processor determines whether PSIHI corresponding to the PDU Set is set or not. In response to determining that the PSIHI corresponding to the PDU Set is set, in step S1770, the processor discards the PDCP SDU. Next, in step S1780, the processor discards remaining one or more PDCP SDUs of the PDU Set to which the PDCP SDU belongs. Else, in step S1790, the processor discards the PDCP SDU (does not discard the remaining one or more PDCP SDUs of the PDU Set to which the PDCP SDU belongs).

Figure 18:
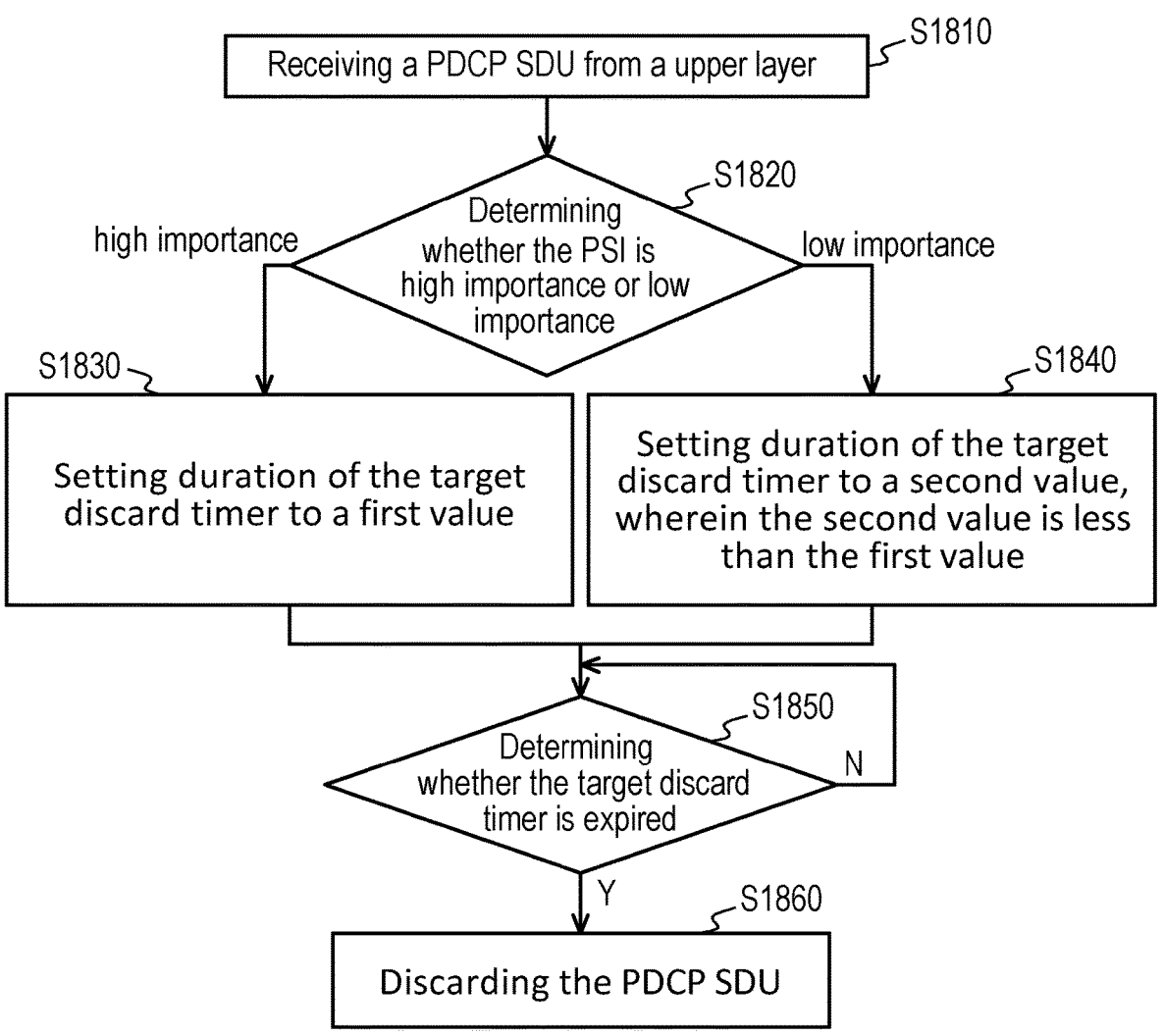
FIG. 18 is a flow chart of a PDCP SDU discard operation based on PSI according to an exemplary embodiment of the present disclosure.

FIG. 18 is a flow chart of a PDCP SDU discard operation based on PSI according to an exemplary embodiment of the present disclosure. In an exemplary embodiment, referring to FIG. 18, in step S1810, the processor receives a PDCP SDU from a upper layer. Next, in step S1820, the processor determines whether the PSI is high importance or low importance. In response to determining that the PSI is high importance, in step S1830, the processor sets duration of the target discard timer to a first value. In response to determining that the PSI is low importance, in step S1840, the processor sets duration of the target discard timer to a second value, wherein the second value is less than the first value. The methods for setting the first value and the second value are described by the above embodiments.

Next, in step S1850, the processor determines whether the target discard timer is expired. In response to determining that the target discard timer is expired, in step S1860, the processor discards the PDCP SDU. In response to determin-
ing that the target discard timer is not expired, back to step
S1850.

Figure 19:
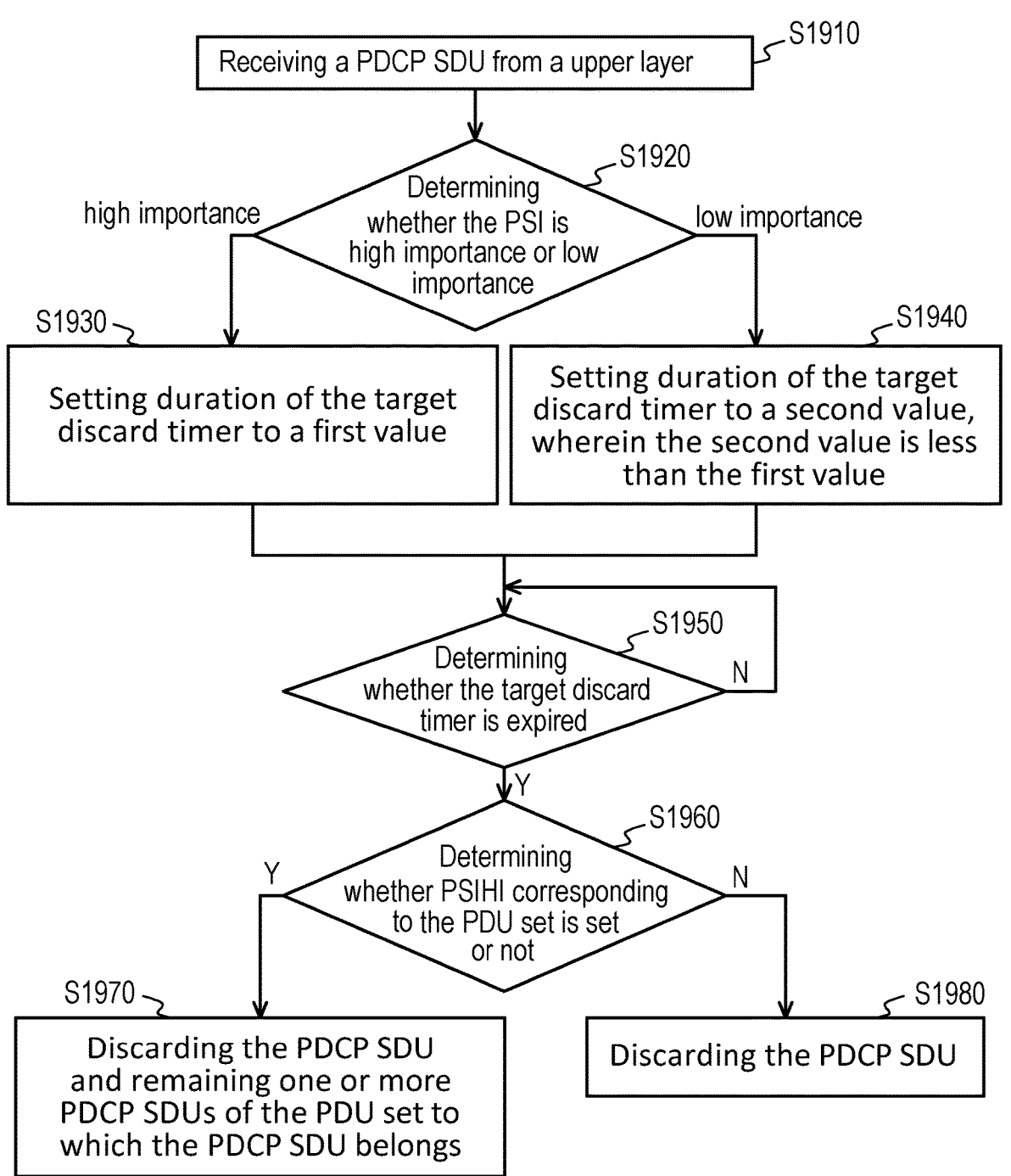
FIG. 19 is a flow chart of a PDCP SDU discard operation based on PSI and PSIHI according to an exemplary embodiment of the present disclosure.

FIG. 19 is a flow chart of a PDCP SDU discard operation
based on PSI and PSIHI according to an exemplary embodi-
ment of the present disclosure. In an exemplary embodi-
ment, referring to FIG. 19, in step S1910, the processor
receives a PDCP SDU from a upper layer. Next, in step
S1920, the processor determines whether the PSI is high
importance or low importance. In response to determining
that the PSI is high importance, in step S1930, the processor
sets duration of the target discard timer to a first value. In
response to determining that the PSI is low importance, in
step S1940, the processor sets duration of the target discard
timer to a second value, wherein the second value is less than
the first value. The methods for setting the first value and the
second value are described by the above embodiments.

Next, in step S1950, the processor determines whether the
target discard timer is expired. In response to determining
that the target discard timer is not expired, back to step
S1950. In response to determining that the target discard
timer is expired, in step S1960, the processor determines
whether PSIHI corresponding to the PDU Set is set or not.
In response to determining that the PSIHI corresponding to
the PDU Set is set, in step S1970, the processor discards the
PDCP SDU and remaining one or more PDCP SDUs of the
PDU Set to which the PDCP SDU belongs. In response to
determining that the PSIHI corresponding to the PDU Set is
not set, in step S1980, the processor discarding the PDCP
SDU.

In an exemplary embodiment, the RRC configuration
comprises a logical parameter, for example, drb-XR, con-
figured to indicate whether a PDCP SDU discard operation
for a DRB is activated.

For example, the network device (e.g., gNB) may con-
figure UE to start (or activate) the PDCP SDU discard for a
DRB (e.g., an XR DRB) based on an indication from upper
layers (e.g., Core networks or Application server). For a
further example, the network device (e.g., gNB) may con-
figure UE to start (or activate) the PDCP SDU discard for a
DRB (e.g., an XR DRB) based on traffic loading (e.g., RAN
congestion, CN congestion, or usage of radio resources). For
a further example, the network device (e.g., gNB) may
configure UE to start (or activate) the PDCP SDU discard for
a DRB (e.g., an XR DRB) based on the charging policy.

In an exemplary embodiment, the network device sends a
PSI-based SDU discard indication to the UE, wherein the
PSI-based SDU discard indication is configured to indicate
whether a PDCP SDU discard operation for the PDCP SDU
for a XR traffic is activated. For example, network device
detects an UL congestion, and sends a broadcast/dedicated
PSI-based SDU discard indication to UE(s) to start/stop
discarding PDCP SDUs for XR traffic. The SDU discard
indication can be set by 1 bit with the granularity of per UE.

Figures 20, 21:
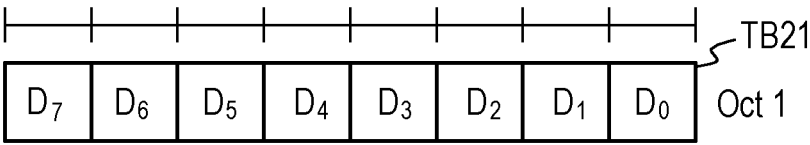
FIG. 20 is a schematic diagram that illustrates a SDU discard indication.
FIG. 21 is a schematic diagram that illustrates a bitmap of a PDCP SDU discard indication.

FIG. 20 is a schematic diagram that illustrates a PSI-based
SDU discard indication. For example, referring to FIG. 20,
table TB20 depicts a field description of PSI-based SDU
discard indication. When the "Bits" field is set as "1",
PSI-based SDU discard indication indicating that to activate
the PDCP SDU discard procedure; and when the "Bits" field
is set as "0", SDU discard indication indicating that to
deactivate the PDCP SDU discard procedure. The granular-
ity can be per UE.

In an exemplary embodiment, network device detects an
UL congestion, and sends a dedicated PSI-based SDU
discard indication to UE to discard PDCP SDUs for XR
traffic, and the network device sends, by MAC CE, a bitmap of a PSI-based PDCP SDU discard indication to the UE,
wherein the bitmap of the PSI-based PDCP SDU discard
indication is configured to indicate whether the PSI-based
PDCP SDU discard opertation for each of a plurality of
DRBs is activated. The granularity can be per DRB.

FIG. 21 is a schematic diagram that illustrates a bitmap of
a PSI-based PDCP SDU discard indication. For example,
referring to FIG. 21, as illustrated by table TB21, each field
in the bitmap TB21 records a 1-bit PSI-based SDU discard
indication for each DRB (e.g., D0 to D7). When the PSI-
based SDU discard indication field of a DRB is set as "1",
it indicates that to activate the PSI-based PDCP SDU discard
procedure for this DRB; and when the PSI-based SDU
discard indication field of a DRB is set as "0", it indicates
that to deactivate the PSI-based PDCP SDU discard proce-
dure for this DRB.

In other words, Di: This field indicates the activation/
deactivation status of the PSI-based SDU discard of DRBi,
where i is the ascending order of the DRB ID among the
DRBs configured with PSI-based SDU discard. The Di field
set to 1 indicates that the PSI-based SDU discard shall be
activated for DRBi. The Di field set to 0 indicates that the
PSI-based SDU discard shall be deactivated for DRBi.

In an embodiment, when the successful delivery of a
PDCP SDU is confirmed by PDCP status report, the trans-
mitting PDCP entity shall discard the PDCP SDU along with
the corresponding PDCP Data PDU.

In an embodiment, If the corresponding PDCP Data PDU
has already been submitted to lower layers, the discard is
indicated to lower layers. For SRBs, when upper layers
request a PDCP SDU discard, the PDCP entity shall discard
all stored PDCP SDUs and PDCP PDUs.

In an embodiment, The transmitting PDCP entity may
discard the PDCP SDU along with the corresponding PDCP
Data PDU. If the corresponding PDCP Data PDU has
already been submitted to lower layers, the discard is
indicated to lower layers (e.g., RLC). Furthermore, when
RLC is indicated from upper layer (i.e. PDCP) to discard a
particular RLC SDU, the transmitting side of a RLC entity
may discard the indicated RLC SDU (especially if neither
the RLC SDU nor a segment thereof has been submitted to
the lower layers). The transmitting side of a RLC entity may
not introduce an RLC SN gap when discarding an RLC
SDU. The network device (e.g., gNB) may configure UE a
threshold value by a RRC message (e.g., a RRCReconfigu-
ration message) to control the buffer status reporting (BSR).
For example, if the number of bytes (or bits) of discarded
RLC SDUs (discarded since the last BSR) exceeds the
threshold, a BSR may be triggered (e.g., RLC may indicate
the event to lower layers (e.g., MAC), and the indication
may trigger a BSR); if the number of discarded RLC SDUs
(since the last buffer status reporting (BSR)) exceeds the
threshold, a BSR may be triggered (e.g., RLC may indicate
the event to lower layers (e.g., MAC), and the indication
may trigger a BSR). The BSR may be considered as "Regu-
lar BSR".

Based on above, the PDCP SDU discard method and the
user equipment provided by the embodiments of the disclo-
sure, are capable of setting and selecting alternative discard
timer for performing PDCP discard operations based on the
parameters, such as PSI, PSIHI, etc., so as to enhance, with
the consideration of PSI and/or PSIHI, the PDCP SDU
discard operation for UL data while receiving a XR traffic
congestion indication. Therefore, the useless and not-so-
important UL data can be discarded as soon as possible
during the XR traffic congestion and the whole transmission
for XR may be efficiently improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A PDCP (Packet Data Convergence Protocol) Service Data Unit (SDU) discard method, adapted for a user equipment(UE), comprising:

setting one or more discard timers based on a Radio Resource Control(RRC) configuration transmitted from a network device;

receiving a PDCP SDU from a upper layer, wherein the PDCP SDU corresponding to a PDU belonging to a PDU Set; receiving, by MAC CE, a bitmap of a PSI-based PDCP SDU discard indication from the network device, wherein the bitmap of the PSI-based PDCP SDU discard indication is to indicate whether PSI-based SDU discard operation for each of a plurality of Data Radio Bearers (DRBs) is activated or deactivated;

prior to determining whether to discard the PDCP SDU, determining, based on the bitmap, whether the PSI-based SDU discard operation for a DRB corresponding to the PDCP SDU is activated;

in response to receiving a PDU Set Importance (PSI)-based SDU discard indication from the network device and in response to the bitmap indicating that the PSI-based SDU discard operation for the DRB corresponding to the PDCP SDU is activated, determining whether to discard the PDCP SDU or not according to a PSI of the PDU Set and a target discard timer, comprising:

identifying the PSI of the PDU Set, wherein the PSI of the PDU Set indicates a relative importance of the PDU Set compared to other PDU Sets;

determining the target discard timer corresponding to the PSI among the one or more discard timers; and discarding the PDCP SDU when the target discard timer is expired.

2. The PDCP SDU discard method according to claim 1, wherein the target discard timer is determined according to the PSI, and the step of determining the target discard timer corresponding to the PSI among the one or more discard timers comprises:

when the PSI is identified as high importance, selecting the target discard timer of which a duration is configured as an enumerated no-expiration timer value of a discardTimer parameter configured by the RRC configuration; and when the PSI is identified as low importance, selecting the target discard timer of which a duration is configured as a default value, wherein the default value is indicated by the RRC configuration, wherein the target discard timer is started when receiving the PDCP SDU.

3. The PDCP SDU discard method according to claim 1, wherein the target discard timer is determined according to the PSI, and the step of determining the target discard timer corresponding to the PSI among the one or more discard timers comprises:

when the PSI is identified as high importance, selecting the target discard timer of which a duration is configured as a first value according to a default value and a discard-Timer-Offset indicated by the RRC configuration; and when the PSI is identified as low importance, selecting the target discard timer of which a duration is configured as a second value according to the default value indicated by the RRC configuration, wherein the second value is less than the first value, wherein the target discard timer is started when receiving the PDCP SDU.

4. The PDCP SDU discard method according to claim 1, wherein the PSI comprises a plurality of PSI levels, the target discard timer is determined according to the PSI, and the step of determining the target discard timer corresponding to the PSI among the one or more discard timers comprises:

selecting the target discard timer of which a duration is configured by:

setting a discard-Timer-Offset based on an identified PSI level of the PSI; and setting the duration of the target discard timer corresponding to the PSI as a sum of the discard-Timer-Offset and a default value, wherein the default value and the discard-Timer-Offset are indicated by the RRC configuration, wherein the target discard timer is started when receiving the PDCP SDU.

5. The PDCP SDU discard method according to claim 1, wherein when the target discard timer of the PDCP SDU expires, the method further comprises:

determining whether PDU Set Integrated Handling Indication(PSIHI) corresponding to the PDU Set is set or not;

in response to determining that the PSIHI is set, discarding the PDCP SDU and remaining one or more PDCP SDUs of the PDU Set to which the PDCP SDU belongs; and in response to determining that the PSIHI is not set, discarding the PDCP SDU.

6. The PDCP SDU discard method according to claim 1, wherein the target discard timer is determined according to the PSI, and the step of determining the target discard timer corresponding to the PSI among the one or more discard timers comprises:

when the PSI is identified as high importance, selecting the target discard timer of which a duration is configured as a first value according to a default value and a discard-Timer-Offset indicated by the RRC configuration and a time interval between receiving the PDCP SDU and receiving first one PDCP SDU of the PDU Set; and when the PSI is identified as low importance, selecting the target discard timer of which a duration is configured as a second value according to the default value indicated by the RRC configuration and the time interval between receiving the PDCP SDU and receiving first one PDCP SDU of the PDU Set, wherein the second value is less than the first value, wherein the target discard timer is started when receiving the PDCP SDU.

7. The PDCP SDU discard method according to claim 1, wherein the RRC configuration comprises a logical parameter, configured to indicate whether a PSI-based SDU discard operation for a Data Radio Bearer (DRB) is activated.

8. The PDCP SDU discard method according to claim 1, wherein the network device sends a PSI-based SDU discard indication to the UE, wherein the PSI-based SDU discard indication is configured to indicate whether a PSI-based PDCP SDU discard operation for the PDCP SDU is activated.

9. The PDCP SDU discard method according to claim 1, further comprising:

in response to determining that a further target discard timer corresponding to the PDCP SDU is expired and not receiving the PSI-based SDU discard indication from the network device, discarding the PDCP SDU when the target discard timer corresponding to the PDCP SDU is expired, wherein the corresponding discard timer is started when receiving the PDCP SDU.

10. A user equipment (UE), comprising:

a transceiver, used for transmitting or receiving signals;

a memory, used for storing a program code; and a processor, coupled to the transceiver and the memory, and configured for executing the program code to:

set one or more discard timers based on a Radio Resource Control(RRC) configuration transmitted from a network device;

receive a PDCP SDU (Service Data Unit) from a upper layer, wherein the PDCP SDU corresponding to a PDU belonging to a PDU Set; receive, by MAC CE, a bitmap of a PSI-based PDCP SDU discard indication from the network device, wherein the bitmap of the PSI-based PDCP SDU discard indication is to indicate whether PSI-based SDU discard operation for each of a plurality of Data Radio Bearers (DRBs) is activated or deactivated;

prior to determining whether to discard the PDCP SDU, determine, based on the bitmap, whether the PSI-based SDU discard operation for a DRB corresponding to the PDCP SDU is activated; and in response to receiving a PSI-based SDU discard indication from the network device and in response to the bitmap indicating that the PSI-based SDU discard operation for the DRB corresponding to the PDCP SDU is activated, determine whether to discard the PDCP SDU or not according to a PSI of the PDU Set and a target discard timer, comprising:

identifying the PSI of the PDU Set, wherein the PSI of the PDU Set indicates a relative importance of the PDU Set compared to other PDU Sets;

determining the target discard timer corresponding to the PSI among the one or more discard timers; and discarding the PDCP SDU when the target discard timer is expired.

11. The UE according to claim 10, wherein the target discard timer is determined according to the PSI, and the step of determining the target discard timer corresponding to the PSI among the one or more discard timers comprises:

when the PSI is identified as high importance, selecting the target discard timer of which a duration is configured as an enumerated no-expiration timer value of a discardTimer parameter configured by the RRC configuration; and when the PSI is identified as low importance, selecting the target discard timer of which a duration is configured as a default value, wherein the default value is indicated by the RRC configuration, wherein the target discard timer is started when receiving the PDCP SDU.

12. The UE according to claim 10, wherein the target discard timer is determined according to the PSI, and the step of determining the target discard timer corresponding to the PSI among the one or more discard timers comprises:

when the PSI is identified as high importance, selecting the target discard timer of which a duration is configured as a first value according to a default value and a discard-Timer-Offset indicated by the RRC configuration; and when the PSI is identified as low importance, selecting the target discard timer of which a duration is configured as a second value according to the default value indicated by the RRC configuration, wherein the second value is less than the first value, wherein the target discard timer is started when receiving the PDCP SDU.

13. The UE according to claim 10, wherein the PSI comprises a plurality of PSI levels, the target discard timer is determined according to the PSI, and the step of determining the target discard timer corresponding to the PSI among the one or more discard timers comprises:

selecting the target discard timer of which a duration is configured by:

setting a discard-Timer-Offset based on an identified PSI level of the PSI; and setting the duration of the target discard timer corresponding to the PSI as a sum of the discard-Timer-Offset and a default value, wherein the default value and the discard-Timer-Offset are indicated by the RRC configuration, wherein the target discard timer is started when receiving the PDCP SDU.

14. The UE according to claim 10, wherein when the target discard timer of the PDCP SDU expires, the processor is further configured to:

determine whether PDU Set Integrated Handling Indication (PSIHI) corresponding to the PDU Set is set or not;

in response to determining that the PSIHI is set, discard the PDCP SDU and remaining one or more PDCP SDUs of the PDU Set to which the PDCP SDU belongs; and in response to determining that the PSIHI is not set, discard the PDCP SDU.

15. The UE according to claim 10, wherein the target discard timer is determined according to the PSI, and the step of determining the target discard timer corresponding to the PSI among the one or more discard timers comprises:

when the PSI is identified as high importance, selecting the target discard timer of which a duration is configured as a first value according to a default value and a discard-Timer-Offset indicated by the RRC configuration and a time interval between receiving the PDCP SDU and receiving first one PDCP SDU of the PDU Set; and when the PSI is identified as low importance, selecting the target discard timer of which a duration is configured as a second value according to the default value indicated by the RRC configuration and the time interval between receiving the PDCP SDU and receiving first one PDCP SDU of the PDU Set, wherein the second value is less than the first value, wherein the target discard timer is started when receiving the PDCP SDU.

16. The UE according to claim 10, wherein the RRC configuration comprises a logical parameter, configured to indicate whether a PSI-based SDU discard operation for a Data Radio Bearer (DRB) is activated.

17. The UE according to claim 10, wherein the network device sends a PSI-based SDU discard indication to the UE, wherein the PSI-based SDU discard indication is configured to indicate whether the PSI-based SDU discard operation for the PDCP SDU is activated.

18. The UE according to claim 10, further comprising:
in response to determining that a further target discard timer corresponding to the PDCP SDU is expired and not receiving the PSI-based SDU discard indication from the network device, discarding the PDCP SDU when the target discard timer corresponding to the PDCP SDU is expired, wherein the corresponding discard timer is started when receiving the PDCP SDU.

* * * * *